United States Patent
Kuriyama et al.

(10) Patent No.: US 9,410,084 B2
(45) Date of Patent: Aug. 9, 2016

(54) LIQUID CRYSTAL DISPLAY DEVICE

(71) Applicant: DIC CORPORATION, Tokyo (JP)

(72) Inventors: Takeshi Kuriyama, Kita-adachi-gun (JP); Jouji Kawamura, Kita-adachi-gun (JP); Seiji Funakura, Kamisu (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/429,299

(22) PCT Filed: Jun. 18, 2013

(86) PCT No.: PCT/JP2013/066687
§ 371 (c)(1),
(2) Date: Mar. 18, 2015

(87) PCT Pub. No.: WO2014/203326
PCT Pub. Date: Dec. 24, 2014

(65) Prior Publication Data
US 2015/0232758 A1    Aug. 20, 2015

(51) Int. Cl.
*G02F 1/1334* (2006.01)
*G02F 1/1335* (2006.01)
(Continued)

(52) U.S. Cl.
CPC ............. *C09K 19/3001* (2013.01); *C09K 19/56* (2013.01); *G02F 1/1334* (2013.01);
(Continued)

(58) Field of Classification Search
CPC .... C09K 19/44; C09K 19/54; C09K 19/3001; C09K 19/3422; C09K 2019/0448; C09K 2019/0466; C09K 2019/122; C09K 2019/123; C09K 2019/3004; C09K 2019/3006; C09K 2019/3016; C09K 2019/3019; C09K 2019/3025; C09K 2019/124; G02F 1/1334; G02F 1/133512; G02F 1/133514
See application file for complete search history.

(56) References Cited

U.S. PATENT DOCUMENTS 8,178,173 B1    5/2012    Matsumoto et al.
8,860,912 B2 *  10/2014   Kaneoya ................ G02B 5/201
                                                252/299.1

(Continued)

FOREIGN PATENT DOCUMENTS

CN    1784481 A    6/2006
CN    101817992 A    9/2010

(Continued)

OTHER PUBLICATIONS

International Search Report dated Feb. 18, 2014, issued in corresponding application No. PCT/JP2013/081728, (2 pages).

(Continued)

*Primary Examiner* — Shean C Wu
(74) *Attorney, Agent, or Firm* — Westerman, Hattori, Daniels & Adrian, LLP

(57) ABSTRACT

The present invention provides a liquid crystal display device that prevents a decrease in the voltage holding ratio (VHR) and an increase in the ion density (ID) in the liquid crystal layer, and resolves the problems of display defects, such as white streaks, variations in alignment, and image sticking. Since a liquid crystal display device according to the present invention has a feature of preventing a decrease in the voltage holding ratio (VHR) and an increase in the ion density (ID) in the liquid crystal layer, and suppressing the occurrence of display defects such as image sticking, the liquid crystal display device is particularly useful for active matrix driving liquid crystal display devices with an IPS mode or an FFS mode and can be applied to liquid crystal display devices such as liquid crystal televisions, monitors, cellular phones, and smart phones.

13 Claims, 1 Drawing Sheet

(51) Int. Cl.
*C09K 19/54* (2006.01)
*C09K 19/30* (2006.01)
*C09K 19/12* (2006.01)
*C09K 19/56* (2006.01)
*C09K 19/04* (2006.01)
*C09K 19/34* (2006.01)

(52) U.S. Cl.
CPC .... *G02F1/133512* (2013.01); *G02F 1/133514* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/3004* (2013.01); *C09K 2019/3006* (2013.01); *C09K 2019/3016* (2013.01); *C09K 2019/3019* (2013.01); *C09K 2019/3025* (2013.01); *C09K 2019/3422* (2013.01)

(56) References Cited

U.S. PATENT DOCUMENTS

| | | | |
|---|---|---|---|
| 8,885,124 B2* | 11/2014 | Kaneoya | C09K 19/3066 252/299.1 |
| 9,120,968 B2* | 9/2015 | Kaneoya | C09K 19/3066 |
| 2006/0257763 A1 | 11/2006 | Araki | |
| 2010/0097562 A1 | 4/2010 | Park et al. | |
| 2010/0271569 A1 | 10/2010 | Ohkuma et al. | |
| 2011/0058138 A1 | 3/2011 | Huh et al. | |
| 2011/0297881 A1 | 12/2011 | Hirata et al. | |
| 2015/0232757 A1* | 8/2015 | Kaneoya | C09K 19/3001 349/89 |
| 2015/0232758 A1 | 8/2015 | Kuriyama et al. | |

FOREIGN PATENT DOCUMENTS

| | | | |
|---|---|---|---|
| JP | 2000-19321 A | 1/2000 | |
| JP | 2000-019321 A | 1/2000 | |
| JP | 2000-192040 A | 7/2000 | |
| JP | 2006-317602 A | 11/2006 | |
| JP | 2007-133131 A | 5/2007 | |
| JP | 2008-144105 A | 6/2008 | |
| JP | 2009-007432 A | 1/2009 | |
| JP | 2009-58546 A | 3/2009 | |
| JP | 2009-109542 A | 5/2009 | |
| JP | 2009-163014 A | 7/2009 | |
| JP | 2010-189560 A | 9/2010 | |
| JP | 2010-250117 A | 11/2010 | |
| JP | 2010-256509 A | 11/2010 | |
| JP | 2010-260997 A | 11/2010 | |
| JP | 2011-141356 A | 7/2011 | |
| JP | 2011-186043 A | 9/2011 | |
| TW | 200621898 A | 7/2006 | |
| WO | 2004/099343 A1 | 11/2004 | |
| WO | 2010/095506 A1 | 8/2010 | |

OTHER PUBLICATIONS

International Search Report, dated May 7, 2013, issued in corresponding appllication numbre PCT/JP2013/045351(2 pages).

* cited by examiner

LIQUID CRYSTAL DISPLAY DEVICE

TECHNICAL FIELD

The present invention relates to a liquid crystal display device.

BACKGROUND ART

Liquid crystal display devices have come to be used in, for example, watches, calculators, various home electric appliances, measuring instruments, automobile panels, word processors, electronic organizers, printers, computers, and televisions. Representative examples of liquid crystal display modes include TN (twisted nematic) mode, STN (super twisted nematic) mode, DS (dynamic scattering) mode, GH (guest host) mode, IPS (in-plane switching) mode, OCB (optically compensated birefringence) mode, ECB (electrically controlled birefringence) mode, VA (vertical alignment) mode, CSH (color super homeotropic) mode, and FLC (ferroelectric liquid crystal). The drive mode shifted from the conventional static driving to multiplex driving, which is commonly used. The mainstream technology is a simple matrix mode and recently an active matrix (AM) mode in which devices are driven with TFTs (thin film transistors) and TFDs (thin film diodes), for example.

Referring to FIG. 1, a typical liquid crystal color display device includes two substrates (1) each having an alignment film (4), a transparent electrode layer (3a) serving as a common electrode and a color filter layer (2) which are disposed between one of the substrates and the alignment film of the one substrate, and a pixel electrode layer (3b) between the other substrate and the alignment film of that other substrate. The substrates are arranged so that the alignment films face each other and a liquid crystal layer (5) is sandwiched between the alignment films.

The color filter layer is constituted by a color filter that includes a black matrix, a red colored layer (R), a green colored layer (G), a blue colored layer (B), and, if needed, a yellow colored layer (Y).

Liquid crystal materials constituting such liquid crystal layers have been subjected to high levels of impurity control since impurities remaining in the materials significantly affect electrical properties of display devices. Regarding the materials that form alignment films, it has been known that the alignment films come into direct contact with the liquid crystal layer and impurities remaining in alignment films migrate to the liquid crystal layer, so that the impurities affect electrical properties of the liquid crystal layer. Studies are now being made in order to determine the properties of liquid crystal display devices affected by the impurities in the alignment film materials.

Materials, such as organic pigments, used in the color filter layer are also presumed to affect the liquid crystal layer due to impurities contained in the materials as with the case of the alignment film materials. However, since an alignment film and a transparent electrode are interposed between the color filter layer and the liquid crystal layer, the direct effects on the liquid crystal layer have been considered to be significantly low compared to those of the alignment film materials. However, alignment films are usually as thin as 0.1 μm or less in thickness. Transparent electrodes that serve as color-filter-layer-side common electrodes are thick so as to enhance the electrical conductivity; however, the thickness thereof is usually only as large as 0.5 μm or less. Accordingly, the color filter layer and the liquid crystal layer are not completely separated from each other. There is a possibility that impurities contained in the color filter layer may migrate through the alignment film and the transparent electrode and cause a decrease in the voltage holding ratio (VHR) and an increase in the ion density (ID) in the liquid crystal layer, thereby leading to display defects such as white streaks, variations in alignment, and image sticking.

Studies have been made to find a way to resolve display defects caused by impurities contained in pigments in color filters: a method of controlling release of impurities into liquid crystals by using a pigment in which the content of extracts obtained with ethyl formate is limited to a particular value or less (PTL 1) and a method of controlling release of impurities into liquid crystals by specifying the pigment in the blue colored layer (PTL 2). However, these methods do not differ much from simply decreasing the amounts of impurities in the pigment and fail to provide sufficient improvements that resolve the display defects even under the recent progress in pigment purification technologies.

Also disclosed are a method that focuses on the relationship between organic impurities contained in the color filter and a liquid crystal composition, in which insolubility of the organic impurities in the liquid crystal layer is indicated by a hydrophobicity parameter of liquid crystal molecules contained in the liquid crystal layer and the value of this hydrophobicity parameter is controlled to a particular value or higher and a method of preparing a liquid crystal composition that contains a particular fraction or more of a liquid crystal compound having a —$OCF_3$ group at an end of the liquid crystal molecule since there is a correlation between this hydrophobicity parameter and the —$OCF_3$ group at an end of a liquid crystal molecule (PTL 3).

However, the essence of the invention disclosed in this literature is to suppress effects of impurities in the pigment on the liquid crystal layer and thus a direct relationship between the structure of the liquid crystal material and the structure of the coloring material such as dyes and pigments used in the color filter has not been investigated. This literature does not resolve the problems related to display defects of liquid crystal display devices that have become increasingly complicated.

CITATION LIST

Patent Literature

PTL 1: Japanese Unexamined Patent Application Publication No. 2000-19321
PTL 2: Japanese Unexamined Patent Application Publication No. 2009-109542
PTL 3: Japanese Unexamined Patent Application Publication No. 2000-192040

SUMMARY OF INVENTION

Technical Problem

The present invention provides a liquid crystal display device that includes a particular liquid crystal composition and a color filter containing a particular pigment, to thereby prevent a decrease in the voltage holding ratio (VHR) and an increase in the ion density (ID) in the liquid crystal layer, and to resolve the problems of display defects, such as white streaks, variations in alignment, and image sticking.

Solution to Problem

The inventors of this application have extensively studied the combination of the structure of the liquid crystal materials constituting the liquid crystal layer and the coloring materials, such as dyes and pigments, that constitute the color filter to address the problems described above. As a result, the inventors have found that a liquid crystal display device that includes a particular liquid crystal material and a color filter containing a particular pigment is capable of preventing a decrease in the voltage holding ratio (VHR) and an increase in the ion density (ID) in the liquid crystal layer and resolving the problems of display defects such as white streaks, variations in alignment, and image sticking. Thus, the inventors have accomplished the invention of this application.

In other words, the present invention provides a liquid crystal display device including: a first substrate; a second substrate; a liquid crystal composition layer sandwiched between the first substrate and the second substrate; a color filter including a black matrix and at least RGB three-color pixel portions; a pixel electrode; and a common electrode, wherein the liquid crystal composition layer contains a liquid crystal composition that contains at least one compound represented by a general formula (I)

[Chem. 1]

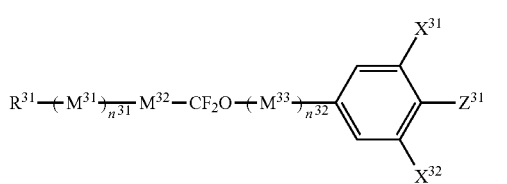

(I)

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group in which one or two —CH$_2$— in the trans-1,4-cyclohexylene group may be replaced by —O— such that oxygen atoms are not directly next to each other, and one or two hydrogen atoms in the phenylene group may be replaced by fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2 and $n^{31}+n^{32}$ is 0, 1, or 2; and in a case where there are a plurality of $M^{31}$ and $M^{33}$, the plurality of $M^{31}$ and $M^{33}$ may be the same or different), and that contains at least one compound selected from the group consisting of compounds represented by a general formula (II-a) to a general formula (II-f),

[Chem. 2]

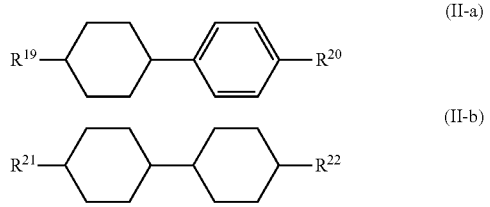

(II-a)

(II-b)

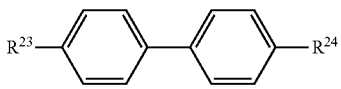

(II-c)

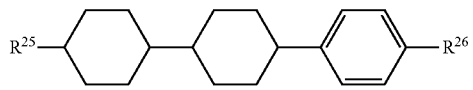

(II-d)

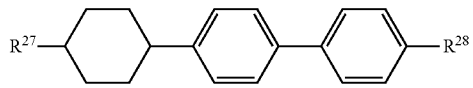

(II-e)

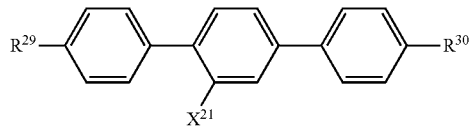

(II-f)

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom), and the RGB three-color pixel portions contain, as a coloring material in the R pixel portion, a diketopyrrolopyrrole-based red pigment having an average primary particle size of 5 to 50 nm measured by a small angle X-ray scattering method.

Advantageous Effects of Invention

A liquid crystal display device according to the present invention includes a particular liquid crystal composition and a color filter that contains a particular pigment, so that a decrease in the voltage holding ratio (VHR) and an increase in the ion density (ID) in the liquid crystal layer can be prevented and display defects such as white streaks, variations in alignment, and image sticking can be prevented.

Figure 1:
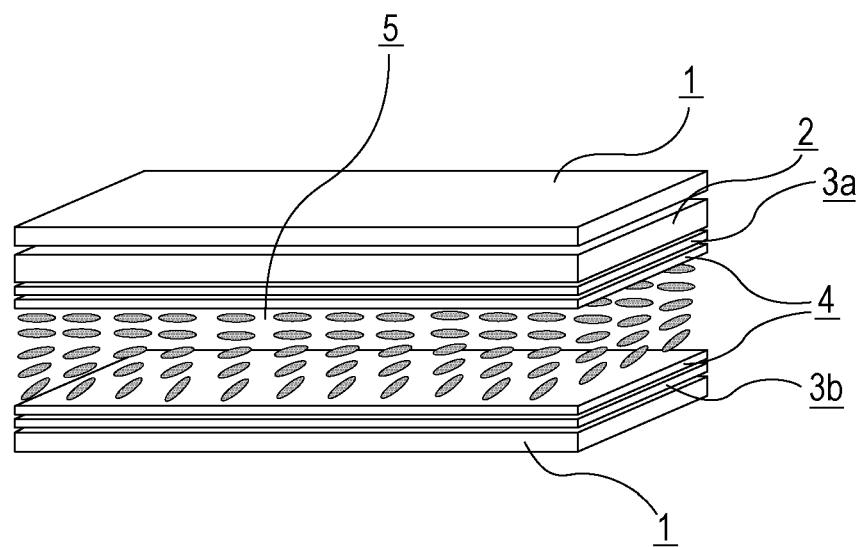
FIG. 1 is a diagram showing an example of a conventional typical liquid crystal display device.

REFERENCE SIGNS LIST 1 substrate
2 color filter layer
2a color filter layer containing a particular pigment
3a transparent electrode layer (common electrode)
3b pixel electrode layer
4 alignment film
5 liquid crystal layer
5a liquid crystal layer containing a particular liquid crystal composition

DESCRIPTION OF EMBODIMENTS

Figure 2:
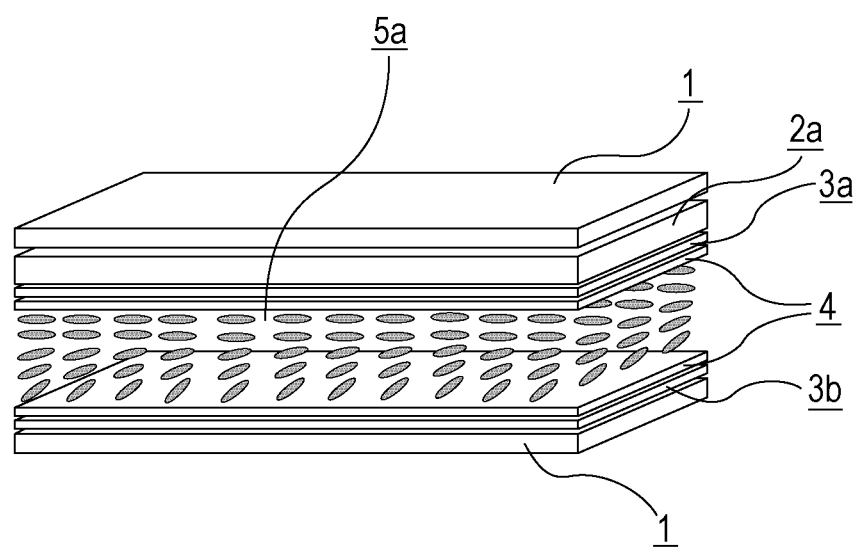
FIG. 2 is a diagram showing an example of a liquid crystal display device according to the present invention.

FIG. 2 shows an example of a liquid crystal display device according to the present invention. A transparent electrode layer (3a) that serves as a common electrode and a color filter layer (2a) that contains a particular pigment are disposed between one of two substrates (1), i.e., a first substrate and a second substrate, each having an alignment film (4), and the alignment film of that one substrate. A pixel electrode layer (3b) is disposed between the other substrate and the alignment film of that substrate. These substrates are arranged so that the alignment films face each other and a liquid crystal layer (5a) containing a particular liquid crystal composition is sandwiched between the alignment films.

The two substrates of the display device are bonded to each other with a sealer and a sealing material disposed in the peripheral region. In most cases, granular spacers or resin spacer columns formed by photolithography are disposed between the two substrates to maintain the substrate-to-substrate distance.

(Liquid Crystal Composition Layer)

A liquid crystal composition layer in a liquid crystal display device according to the present invention contains a liquid crystal composition that contains at least one compound represented by a general formula (I)

[Chem. 3]

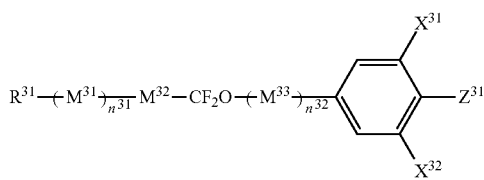

(I)

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group in which one or two —$CH_2$— in the trans-1,4-cyclohexylene group may be replaced by —O— such that oxygen atoms are not directly next to each other, and one or two hydrogen atoms in the phenylene group may be replaced by fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2 and $n^{31}+n^{32}$ is 0, 1, or 2; and in a case where there are a plurality of $M^{31}$ and $M^{33}$, the plurality of $M^{31}$ and $M^{33}$ may be the same or different), and that contains at least one compound selected from the group consisting of compounds represented by a general formula (II-a) to a general formula (II-f),

[Chem. 4]

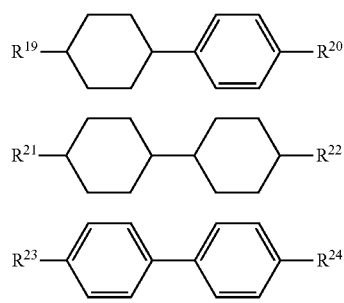

(II-a)

(II-b)

(II-c)

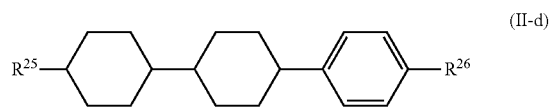

(II-d)

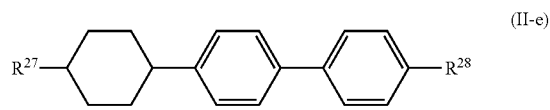

(II-e)

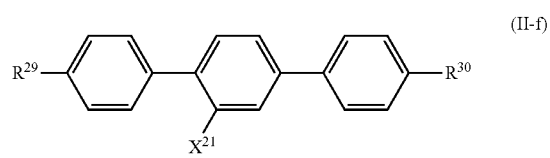

(II-f)

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom).

In the general formula (I), in a case where the ring structure to which $R^{31}$ is bonded is a phenyl group (aromatic), $R^{31}$ preferably represents a linear alkyl group having 1 to 5 carbon atoms, a linear alkoxy group having 1 to 4 (or more) carbon atoms, or an alkenyl group having 4 to 5 carbon atoms; and, in a case where the ring structure to which $R^{31}$ is bonded is a saturated ring structure such as cyclohexane, pyran, or dioxane, $R^{31}$ preferably represents a linear alkyl group having 1 to 5 carbon atoms, a linear alkoxy group having 1 to 4 (or more) carbon atoms, or a linear alkenyl group having 2 to 5 carbon atoms.

In a case where high chemical stability with respect to heat or light is a priority, $R^{31}$ preferably represents an alkyl group. Alternatively, in a case where low viscosity and production of a liquid crystal display element having a high response speed are priorities, $R^{31}$ preferably represents an alkenyl group. In addition, in order to achieve low viscosity, a high nematic-isotropic phase transition temperature (Tni), and a faster response speed, preferably used is an alkenyl group in which the unsaturated bond is not present at the end, particularly preferred is an alkenyl group and a methyl group that is at the end and next to the alkenyl group. In a case where high solubility at low temperature is a priority, $R^{31}$ preferably represents an alkoxy group; alternatively, multiple types of $R^{31}$ are preferably used in combination. For example, regarding $R^{31}$, compounds having alkyl or alkenyl groups having 2, 3, and 4 carbon atoms are preferably used in combination; compounds having 3 and 5 carbon atoms are preferably used in combination; or compounds having 3, 4, and 5 carbon atoms are preferably used in combination.

$M^{31}$ to $M^{33}$ preferably represent the following structures.

[Chem. 5]

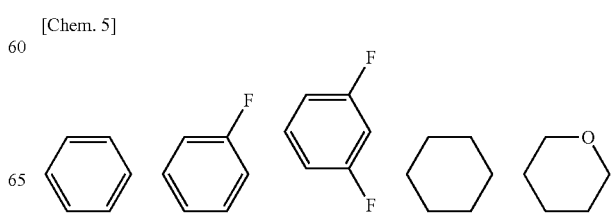

-continued

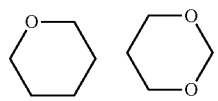

$M^{31}$ preferably represents the following structures.

[Chem. 6]

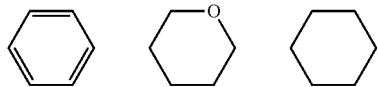

$M^{31}$ more preferably represents the following structures.

[Chem. 7]

$M^{32}$ preferably represents the following structures.

[Chem. 8]

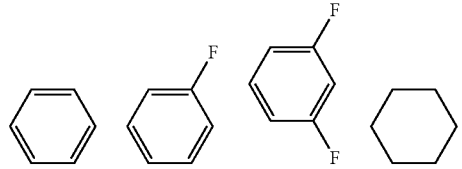

$M^{32}$ more preferably represents the following structures.

[Chem. 9]

$M^{32}$ still more preferably represents the following structures.

[Chem. 10]

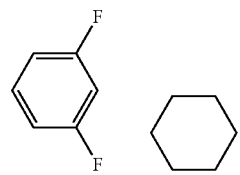

$M^{33}$ preferably represents the following structures.

[Chem. 11]

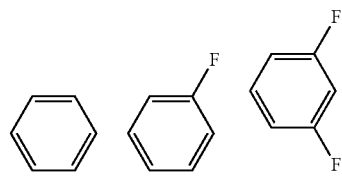

$M^{33}$ more preferably represents the following structures.

[Chem. 12]

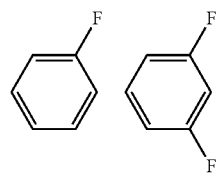

$M^{33}$ still more preferably represents the following structure.

[Chem. 13]

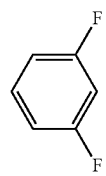

At least one of $X^{31}$ and $X^{32}$ preferably represents a fluorine atom and both of $X^{31}$ and $X^{32}$ more preferably represent fluorine atoms.

$Z^{31}$ preferably represents a fluorine atom or a trifluoromethoxy group.

Regarding the combination of $X^{31}$, $X^{32}$, and $Z^{31}$, in one embodiment, $X^{31}$=F, $X^{32}$=F, and $Z^{31}$=F. In another embodiment, $X^{31}$=F, $X^{32}$=H, and $Z^{31}$=F. In still another embodiment, $X^{31}$=F, $X^{32}$=H, and $Z^{31}$=OCF$^3$. In still another embodiment, $X^{31}$=F, $X^{32}$=F, and $Z^{31}$=OCF$^3$. In still another embodiment, $X^{31}$=H, $X^{32}$=H, and $Z^{31}$=OCF$^3$.

$n^{31}$ preferably represents 1 or 2, $n^{32}$ preferably represents 0 or 1 and more preferably 0, and $n^{31}+n^{32}$ is preferably 1 or 2 and more preferably 2.

More specifically, compounds represented by the general formula (I) are preferably compounds represented by a general formula (I-a) to a general formula (I-f) below.

[Chem. 14]

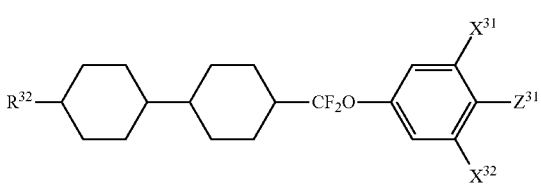

(I-a)

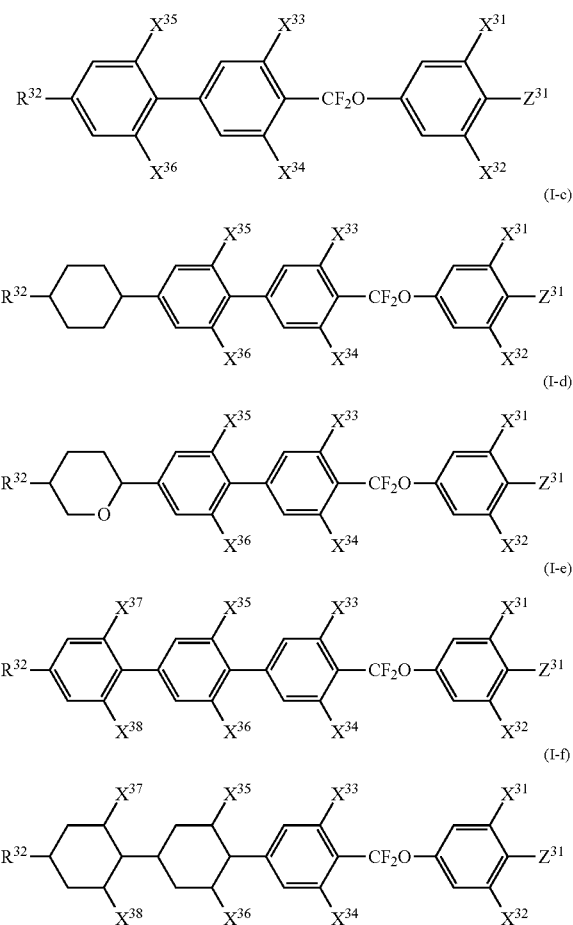

(In the formulae, $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{31}$ to $X^{38}$ each independently represent a hydrogen atom or a fluorine atom; and $Z^{31}$ represents a fluorine atom, a trifluoromethoxy group or a trifluoromethyl group).

In the general formula (Ia) to the general formula (If), in a case where the ring structure to which $R^{32}$ is bonded is a phenyl group (aromatic), $R^{32}$ preferably represents a linear alkyl group having 1 to 5 carbon atoms, a linear alkoxy group having 1 to 4 (or more) carbon atoms, or an alkenyl group having 4 to 5 carbon atoms; and, in a case where the ring structure to which $R^{32}$ is bonded is a saturated ring structure such as cyclohexane, pyran, or dioxane, $R^{32}$ preferably represents a linear alkyl group having 1 to 5 carbon atoms, a linear alkoxy group having 1 to 4 (or more) carbon atoms, or a linear alkenyl group having 2 to 5 carbon atoms.

In a case where high chemical stability with respect to heat or light is a priority, $R^{31}$ preferably represents an alkyl group. Alternatively, in a case where low viscosity and production of a liquid crystal display element having a high response speed are priorities, $R^{31}$ preferably represents an alkenyl group. In addition, in order to achieve low viscosity, a high nematic-isotropic phase transition temperature (Tni), and a faster response speed, preferably used is an alkenyl group in which the unsaturated bond is not present at the end, particularly preferred is an alkenyl group and a methyl group that is at the end and next to the alkenyl group. In a case where high solubility at low temperature is a priority, $R^{31}$ preferably represents an alkoxy group; alternatively, multiple types of $R^{31}$ are preferably used in combination. For example, regarding $R^{31}$, compounds having alkyl or alkenyl groups having 2, 3, and 4 carbon atoms are preferably used in combination; compounds having 3 and 5 carbon atoms are preferably used in combination; or compounds having 3, 4, and 5 carbon atoms are preferably used in combination.

At least one of $X^{31}$ and $X^{32}$ preferably represents a fluorine atom and both of $X^{31}$ and $X^{32}$ more preferably represent fluorine atoms.

$Z^{31}$ preferably represents a fluorine atom or a trifluoromethoxy group.

Regarding the combination of $X^{31}$, $X^{32}$, and $Z^{31}$, in one embodiment, $X^{31}$=F, $X^{32}$=F, and $Z^{31}$=F. In another embodiment, $X^{31}$=F, $X^{32}$=H, and $Z^{31}$=F. In still another embodiment, $X^{31}$=F, $X^{32}$=H, and $Z^{31}$=OCF$^3$. In still another embodiment, $X^{31}$=F, $X^{32}$=F, and $Z^{31}$=OCF$^3$. In still another embodiment, $X^{31}$=H, $X^{32}$=H, and $Z^{31}$=OCF$^3$.

$n^{31}$ preferably represents 1 or 2, $n^{32}$ preferably represents 0 or 1 and more preferably 0, and $n^{31}+n^{32}$ is preferably 1 or 2 and more preferably 2.

At least one of $X^{33}$ and $X^{34}$ preferably represents a fluorine atom and both of $X^{33}$ and $X^{34}$ more preferably represent fluorine atoms.

At least one of $X^{35}$ and $X^{36}$ preferably represents a fluorine atom. However, it is not preferred that both of $X^{35}$ and $X^{36}$ represent fluorine atoms in view of Tni, solubility at low temperature, and chemical stability in the form of a liquid crystal display element, though it is effective in an increase in Δ∈.

At least one of $X^{37}$ and $X^{38}$ preferably represents a hydrogen atom and both of $X^{37}$ and $X^{38}$ preferably represent hydrogen atoms. It is not preferred that at least one of $X^{37}$ and $X^{38}$ represent a fluorine atom in view of Tni, solubility at low temperature, and chemical stability in the form of a liquid crystal display element.

One to eight of the compounds represented by the general formula (I) are preferably contained and one to five of the compounds are particularly preferably contained. The content of the compounds is preferably 3% to 50% by mass and more preferably 5% to 40% by mass.

In the general formula (IIa) to the general formula (IIf), in a case where the ring structures to which $R^{19}$ to $R^{30}$ are bonded are phenyl groups (aromatics), $R^{19}$ to $R^{30}$ preferably represent a linear alkyl group having 1 to 5 carbon atoms, a linear alkoxy group having 1 to 4 (or more) carbon atoms, or an alkenyl group having 4 to 5 carbon atoms; and, in a case where the ring structures to which $R^{19}$ to $R^{30}$ are bonded are saturated ring structures such as cyclohexane, pyran, and dioxane, $R^{19}$ to $R^{30}$ preferably represent a linear alkyl group having 1 to 5 carbon atoms, a linear alkoxy group having 1 to 4 (or more) carbon atoms, or a linear alkenyl group having 2 to 5 carbon atoms.

In a case where high chemical stability with respect to heat or light is a priority, $R^{19}$ to $R^{30}$ preferably represent an alkyl group. Alternatively, in a case where low viscosity and production of a liquid crystal display element having a high response speed are priorities, $R^{19}$ to $R^{30}$ preferably represent an alkenyl group. In addition, in order to achieve low viscosity, a high nematic-isotropic phase transition temperature (Tni), and a faster response speed, preferably used is an alkenyl group in which the unsaturated bond is not present at the end, particularly preferred is an alkenyl group and a methyl group that is at the end and next to the alkenyl group.

In a case where high solubility at low temperature is a priority, $R^{19}$ to $R^{30}$ preferably represent an alkoxy group; alternatively, multiple types of $R^{19}$ to $R^{30}$ are preferably used in combination. For example, regarding $R^{19}$ to $R^{30}$, compounds having alkyl or alkenyl groups having 2, 3, and 4 carbon atoms are preferably used in combination; compounds having 3 and 5 carbon atoms are preferably used in combination; or compounds having 3, 4, and 5 carbon atoms are preferably used in combination.

$R^{19}$ and $R^{20}$ preferably represent an alkyl group or an alkoxy group and at least one of $R^{19}$ and $R^{20}$ preferably represents an alkoxy group. More preferred is a case where $R^{19}$ represents an alkyl group and $R^{20}$ represents an alkoxy group. Still more preferred is a case where $R^{19}$ represents an alkyl group having 3 to 5 carbon atoms and $R^{20}$ represents an alkoxy group having 1 to 2 carbon atoms.

$R^{21}$ and $R^{22}$ preferably represent an alkyl group or an alkenyl group and at least one of $R^{21}$ and $R^{22}$ preferably represents an alkenyl group. A compound in which both $R^{21}$ and $R^{22}$ are alkenyl groups is suitably used to improve the response speed, but is not preferred in a case where the chemical stability of a liquid crystal display element is improved.

At least one of $R^{23}$ and $R^{24}$ preferably represents an alkyl group having 1 to 5 carbon atoms, an alkoxy group having 1 to 5 carbon atoms, or an alkenyl group having 4 to 5 carbon atoms. In order to achieve good balance between response speed and Tni, at least one of $R^{23}$ and $R^{24}$ preferably represents an alkenyl group. In order to achieve good balance between response speed and solubility at low temperature, at least one of $R^{23}$ and $R^{24}$ preferably represents an alkoxy group.

At least one of $R^{25}$ and $R^{26}$ preferably represents an alkyl group having 1 to 5 carbon atoms, an alkoxy group having 1 to 5 carbon atoms, or an alkenyl group having 2 to 5 carbon atoms. In order to achieve good balance between response speed and Tni, at least one of $R^{25}$ and $R^{26}$ preferably represents an alkenyl group. In order to achieve good balance between response speed and solubility at low temperature, at least one of $R^{25}$ and $R^{26}$ preferably represents an alkoxy group. More preferably, $R^{25}$ represents an alkenyl group and $R^{26}$ represents an alkyl group. It is also preferred that $R^{25}$ represent an alkyl group and $R^{26}$ represent an alkoxy group.

At least one of $R^{27}$ and $R^{28}$ preferably represents an alkyl group having 1 to 5 carbon atoms, an alkoxy group having 1 to 5 carbon atoms, or an alkenyl group having 2 to 5 carbon atoms. In order to achieve good balance between response speed and Tni, at least one of $R^{27}$ and $R^{28}$ preferably represents an alkenyl group. In order to achieve good balance between response speed and solubility at low temperature, at least one of $R^{27}$ and $R^{28}$ preferably represents an alkoxy group. More preferably, $R^{27}$ represents an alkyl group or an alkenyl group and $R^{28}$ represents an alkyl group. It is also preferred that $R^{27}$ represent an alkyl group and $R^{28}$ represent an alkoxy group. Furthermore, it is particularly preferred that $R^{27}$ represent an alkyl group and $R^{28}$ represent an alkyl group.

$X^{21}$ is preferably a fluorine atom.

At least one of $R^{29}$ and $R^{30}$ preferably represents an alkyl group having 1 to 5 carbon atoms or an alkenyl group having 4 to 5 carbon atoms. In order to achieve good balance between response speed and Tni, at least one of $R^{29}$ and $R^{30}$ preferably represents an alkenyl group. In order to achieve high reliability, at least one of $R^{29}$ and $R^{30}$ preferably represents an alkyl group. More preferably, $R^{29}$ represents an alkyl group or an alkenyl group and $R^{30}$ represents an alkyl group or an alkenyl group. It is also preferred that $R^{29}$ represent an alkyl group and $R^{30}$ represent an alkenyl group. Furthermore, it is also preferred that $R^{29}$ represent an alkyl group and $R^{30}$ represent an alkyl group.

One to ten of the compounds represented by the general formula (II-a) to the general formula (II-f) are preferably contained and one to eight of the compounds are particularly preferably contained. The content of the compounds is preferably 5% to 80% by mass, more preferably 10% to 70% by mass, and particularly preferably 20% to 60% by mass.

A liquid crystal composition layer in a liquid crystal display device according to the present invention may further contain at least one compound selected from the group consisting of compounds represented by a general formula (III-a) to a general formula (III-f).

[Chem. 15]

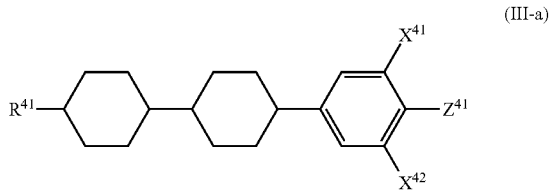

(III-a)

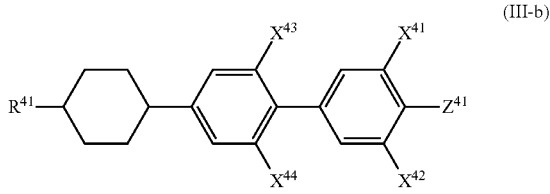

(III-b)

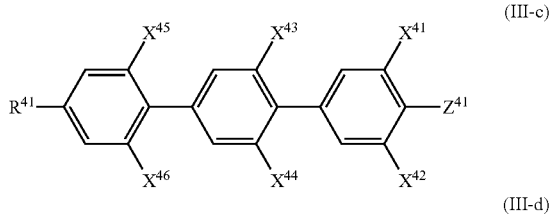

(III-c)

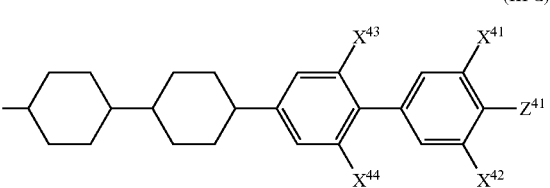

(III-d)

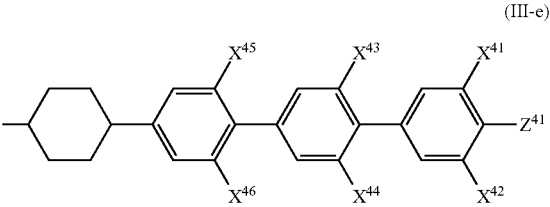

(III-e)

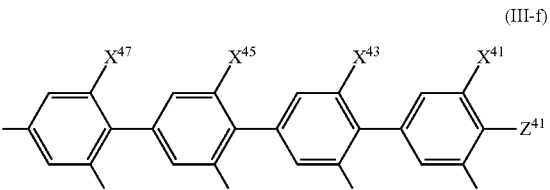

(III-f)

(In the formulae, $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group.)

In the general formula (IIIa) to the general formula (IIIf), in a case where the ring structure to which $R^{41}$ is bonded is a phenyl group (aromatic), $R^{41}$ preferably represents a linear alkyl group having 1 to 5 carbon atoms, a linear alkoxy group having 1 to 4 (or more) carbon atoms, or an alkenyl group having 4 to 5 carbon atoms. In a case where the ring structure to which $R^{41}$ is bonded is a saturated ring structure such as cyclohexane, pyran, or dioxane, $R^{41}$ preferably represents a linear alkyl group having 1 to 5 carbon atoms, a linear alkoxy group having 1 to 4 (or more) carbon atoms, or a linear alkenyl group having 2 to 5 carbon atoms.

In a case where high chemical stability with respect to heat or light is a priority, $R^{41}$ preferably represents an alkyl group. Alternatively, in a case where low viscosity and production of a liquid crystal display element having a high response speed are priorities, $R^{41}$ preferably represents an alkenyl group. In addition, in order to achieve low viscosity, a high nematic-isotropic phase transition temperature (Tni), and a faster response speed, preferably used is an alkenyl group in which the unsaturated bond is not present at the end, particularly preferred is an alkenyl group and a methyl group that is at the end and next to the alkenyl group. In a case where high solubility at low temperature is a priority, $R^{41}$ preferably represents an alkoxy group; alternatively, multiple types of $R^{41}$ are preferably used in combination. For example, regarding $R^{41}$, compounds having alkyl or alkenyl groups having 2, 3, and 4 carbon atoms are preferably used in combination; compounds having 3 and 5 carbon atoms are preferably used in combination; or compounds having 3, 4, and 5 carbon atoms are preferably used in combination.

At least one of $X^{41}$ and $X^{42}$ preferably represents a fluorine atom and both of $X^{41}$ and $X^{42}$ more preferably represent fluorine atoms.

$Z^{41}$ preferably represents a fluorine atom or a trifluoromethoxy group.

Regarding the combination of $X^{41}$, $X^{42}$, and $Z^{41}$, in one embodiment, $X^{41}$=F, $X^{42}$=F, and $Z^{41}$=F. In another embodiment, $X^{41}$=F, $X^{42}$=H, and $Z^{41}$=F. In still another embodiment, $X^{41}$=F, $X^{42}$=H, and $Z^{41}$=OCF3. In still another embodiment, $X^{41}$=F, $X^{42}$=F, and $Z^{41}$=OCF3. In still another embodiment, $X^{41}$=H, $X^{42}$=H, and $Z^{41}$=OCF3.

At least one of $X^{43}$ and $X^{44}$ preferably represents a fluorine atom and both of $X^{43}$ and $X^{44}$ preferably represent fluorine atoms in order to achieve high $\Delta\in$. However, it is not preferred that both of $X^{43}$ and $X^{44}$ represent fluorine atoms for achieving high solubility at low temperature.

At least one of $X^{45}$ and $X^{46}$ preferably represents a hydrogen atom and both of $X^{45}$ and $X^{46}$ more preferably represent hydrogen atoms. The use of fluorine atoms in a large amount is not preferred in view of Tni, solubility at low temperature, and chemical stability in the form of a liquid crystal display element.

At least one of $X^{47}$ and $X^{48}$ preferably represents a hydrogen atom and both of $X^{47}$ and $X^{48}$ more preferably represent hydrogen atoms. It is not preferred that at least one of $X^{47}$ and $X^{48}$ represent a fluorine atom in view of Tni, solubility at low temperature, and chemical stability in the form of a liquid crystal display element.

One to ten of the compounds selected from the group consisting of the compounds represented by the general formula (III-a) to the general formula (III-f) are preferably contained and one to eight of the compounds are more preferably contained. The content of the compounds is preferably 5% to 50% by mass and more preferably 10% to 40% by mass.

In the liquid crystal composition of a liquid crystal composition layer in a liquid crystal display device according to the present invention, $\Delta\in$ at 25° C. is preferably +1.5 or more. In order to achieve high speed response, $\Delta\in$ is preferably +1.5 to +4.0, more preferably +1.5 to +3.0. In order to achieve low voltage driving, $\Delta\in$ is preferably +8.0 to +18.0, more preferably +10.0 to +15.0. Furthermore, $\Delta n$ at 25° C. is preferably 0.08 to 0.14 and more preferably 0.09 to 0.13. More specifically, $\Delta n$ is preferably 0.10 to 0.13 in a case where a small cell gap is employed; and $\Delta n$ is preferably 0.08 to 0.10 in a case where a large cell gap is employed. Moreover, η at 20° C. is preferably 5 to 45 mPa·s, more preferably 5 to 25 mPa·s, and particularly preferably 10 to 20 mPa·s. $T_{ni}$ is preferably 60° C. to 120° C., more preferably 70° C. to 100° C., and particularly preferably 70° C. to 85° C.

In addition to the above-described compounds, a liquid crystal composition in the present invention may contain standard nematic liquid crystal, smectic liquid crystal, cholesteric liquid crystal, or the like.

A liquid crystal composition in the present invention may contain at least one polymerizable compound for the purpose of producing a liquid crystal display element with, for example, a PS mode, a transverse electric field-type PSA mode, or a transverse electric field-type PSVA mode. For example, a photopolymerizable monomer whose polymerization proceeds with energy rays such as light can be used as the polymerizable compound. In terms of structure, a polymerizable compound having a liquid crystal skeleton formed by bonding a plurality of six-membered rings, such as a biphenyl derivative or a terphenyl derivative, is exemplified. More specifically, the polymerizable compound is preferably a bifunctional monomer represented by a general formula (V).

[Chem. 16]

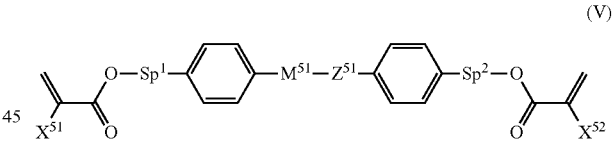

(V)

(In the formula, $X^{51}$ and $X^{52}$ each independently represent a hydrogen atom or a methyl group; $Sp^1$ and $Sp^2$ each independently represent a single bond, an alkylene group having 1 to 8 carbon atoms, or —O—$(CH_2)_s$— (where s represents an integer of 2 to 7 and the oxygen atom is bonded to the aromatic ring); $Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—OCO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—OCO—, —CH$_2$—OCO—, —CY$^1$=CY$^2$— (where Y$^1$ and Y$^2$ each independently represent a fluorine atom or a hydrogen atom), —C≡C—, or a single bond; $M^{51}$ represents a 1,4-phenylene group, a trans-1,4-cyclohexylene group, or a single bond; and any hydrogen atom in all 1,4-phenylene groups in the formula may be replaced by a fluorine atom).

The polymerizable compound is preferably any of a diacrylate derivative in which $X^{51}$ and $X^{52}$ each represent a hydrogen atom and a dimethacrylate derivative in which $X^{51}$ and $X^{52}$ each represent a methyl group, and is also preferably a compound in which one of $X^{51}$ and $X^{52}$ represents a hydrogen atom and the other represents a methyl group. Among these compounds, the diacrylate derivative has the highest rate of polymerization, the dimethacrylate derivative has a low rate of polymerization, and the asymmetrical compound has an intermediate rate of polymerization. A preferred one can be used in accordance with the applications. In a PSA display element, the dimethacrylate derivative is particularly preferred.

$Sp^1$ and $Sp^2$ each independently represent a single bond, an alkylene group having 1 to 8 carbon atoms, or —O—$(CH_2)_s$—. In a PSA display element, at least one of $Sp^1$ and $Sp^2$ preferably represents a single bond. A compound in which $Sp^1$ and $Sp^2$ each represent a single bond or a compound in which one of $Sp^1$ and $Sp^2$ represents a single bond and the other represents an alkylene group having 1 to 8 carbon atoms or —O—$(CH_2)_s$— is preferred. In this case, a 1-4 alkyl group is preferred and s is preferably 1 to 4.

$Z^{51}$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and particularly preferably a single bond.

$M^{51}$ represents a 1,4-phenylene group in which any of hydrogen atoms may be replaced by fluorine atoms, a trans-1,4-cyclohexylene group, or a single bond and preferably represents a 1,4-phenylene group or a single bond. In a case where C represents a ring structure other than a single bond, $Z^{51}$ preferably represents a linking group other than a single bond. In a case where $M^{51}$ represents a single bond, $Z^{51}$ preferably represents a single bond.

In view of the foregoing, specifically, the ring structure between $Sp^1$ and $Sp^2$ in the general formula (V) is preferably the following structure.

In a case where $M^{51}$ represents a single bond and the ring structure is constituted by two rings in the general formula (V), the ring structure is preferably represented by a formula (Va-1) to a formula (Va-5) below, more preferably represented by the formula (Va-1) to the formula (Va-3), and particularly preferably represented by the formula (Va-1).

[Chem. 17]

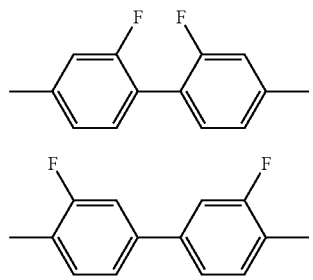

(Va-1)

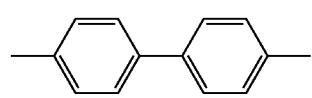

(Va-2)

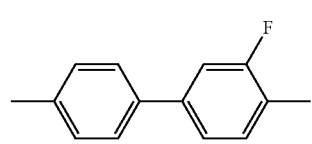

(Va-3)

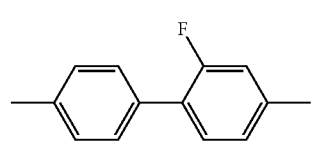

-continued (Va-4)

(Va-5)

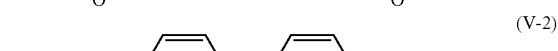

(In the formulae, both ends are bonded to $Sp^1$ and $Sp^2$.)

A polymerizable compound having such a skeleton is polymerized to provide an anchoring strength that is optimal for PSA-type liquid crystal display elements, so that a good alignment state is achieved. Therefore, unevenness in displaying is suppressed or completely prevented.

Accordingly, the polymerizable compound is particularly preferably represented by a general formula (V-1) to a general formula (V-4) and most preferably represented by the general formula (V-2).

[Chem. 18]

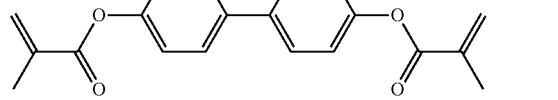

(V-1)

(V-2)

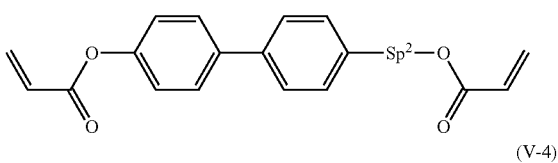

(V-3)

(V-4)

(In the formulae, $Sp^2$ represents an alkylene group having 2 to 5 carbon atoms.)

In a case where such a polymerizable compound is added to a liquid crystal composition in the present invention, polymerization proceeds even in the absence of a polymerization initiator, but a polymerization initiator may be contained to facilitate the polymerization. Examples of the polymerization initiator include benzoin ethers, benzophenones, acetophenones, benzylketals, and acylphosphine oxides.

A liquid crystal composition containing a polymerizable compound in the present invention is provided with a liquid crystal alignment capability by polymerizing the polymerizable compound therein through irradiation with ultraviolet rays and is used for liquid crystal display elements that control the amount of transmitted light by using the birefringence of the liquid crystal composition. The liquid crystal composition is useful for liquid crystal display elements such as an AM-LCD (active matrix liquid crystal display element), a TN (nematic liquid crystal display element), an STN-LCD (super-twisted nematic liquid crystal display element), an OCB-LCD, and an IPS-LCD (in-plane switching liquid crystal display element). The liquid crystal composition is particularly useful for AM-LCDs and can be used for transmission or reflection-type liquid crystal display elements.

(Color Filter)

A color filter in the present invention includes a black matrix and at least RGB three-color pixel portions. The RGB three-color pixel portions contain, as a coloring material in the R pixel portion, a diketopyrrolopyrrole-based red pigment having an average primary particle size of 5 to 50 nm measured by a small angle X-ray scattering method.

(R Pixel Portion)

The R pixel portion contains a diketopyrrolopyrrole-based red pigment having an average primary particle size of 5 to 50 nm, more preferably 10 to 30 nm, measured by a small angle X-ray scattering method. Specifically, the diketopyrrolopyrrole pigment is preferably at least one selected from C.I. Pigment Red 254, 255, 264, and 272 and Orange 71 and 73, more preferably at least one selected from Red 254, 255, 264, and 272, particularly preferably C.I. Pigment Red 254.

In addition, a pigment derivative is preferably contained as a dispersion aid. Such a pigment derivative contained is preferably at least one of a quinacridone-based pigment derivative, a diketopyrrolopyrrole-based pigment derivative, an anthraquinone-based pigment derivative, and a thiazine-based pigment derivative. The derivative moiety may be a phthalimidemethyl group, a sulfonic group, an N-(dialkylamino)methyl group, or an N-(dialkylaminoalkyl)sulfonamide group. Among such derivatives, two or more different derivatives may be used in combination.

The amount of such a pigment derivative used with respect to 100 parts of the diketopyrrolopyrrole-based red pigment is preferably 4 parts or more and 17 parts or less, more preferably 6 parts or more and 13 parts or less.

(G Pixel Portion)

The G pixel portion preferably contains at least one selected from the group consisting of a halogenated metal phthalocyanine pigment, a phthalocyanine-based green dye, and a mixture of a phthalocyanine-based blue dye and an azo-based yellow organic dye. Preferably, the halogenated metal phthalocyanine pigment has, as a central metal, a metal selected from the group consisting of Al, Si, Sc, Ti, V, Mg, Fe, Co, Ni, Zn, Cu, Ga, Ge, Y, Zr, Nb, In, Sn, and Pb; in a case where the central metal is trivalent, the central metal is bonded to any one of a halogen atom, a hydroxy group, and a sulfonic group, or the central metal is oxo- or thio-bridged; and, in a case where the central metal is a tetravalent metal, the central metal is bonded to one oxygen atom or two selected from halogen atoms, hydroxy groups, and sulfonic groups, the selected two being the same or different. Such halogenated metal phthalocyanine pigments may be halogenated metal phthalocyanine pigments that belong to the following two groups.

(First Group)

A halogenated metal phthalocyanine pigment having, as a central metal, a metal selected from the group consisting of Al, Si, Sc, Ti, V, Mg, Fe, Co, Ni, Zn, Cu, Ga, Ge, Y, Zr, Nb, In, Sn, and Pb and having a structure in which 8 to 16 halogen atoms per molecule of phthalocyanine are bonded to benzene rings of a phthalocyanine molecule; in a case where the central metal is trivalent, the central metal is bonded to any one of a halogen atom, a hydroxy group, and a sulfonic group (—SO3H); and, in a case where the central metal is a tetravalent metal, the central metal is bonded to one oxygen atom or two selected from halogen atoms, hydroxy groups, and sulfonic groups, the selected two being the same or different.

(Second Group)

A pigment composed of a halogenated metal phthalocyanine dimer including, as constitutional units, two molecules of a halogenated metal phthalocyanine having, as a central metal, a trivalent metal selected from the group consisting of Al, Sc, Ga, Y, and In and having a structure in which 8 to 16 halogen atoms per molecule of phthalocyanine are bonded to benzene rings of a phthalocyanine molecule; and the central metals of the constitutional units are bonded to each other through a divalent atomic group selected from the group consisting of an oxygen atom, a sulfur atom, sulfinyl (—SO—), and sulfonyl (—SO2-).

In such a halogenated metal phthalocyanine pigment, all the halogen atoms that are bonded to the benzene rings may be the same or different from each other. Different halogen atoms may be bonded to a single benzene ring.

A halogenated metal phthalocyanine pigment in which 9 to 15 bromine atoms among 8 to 16 halogen atoms per molecule of phthalocyanine are bonded to benzene rings of a phthalocyanine molecule assumes yellowish bright green and is optimally used for a green pixel portion of a color filter. The halogenated metal phthalocyanine pigment is insoluble or sparingly soluble in water or an organic solvent. The halogenated metal phthalocyanine pigment may be a pigment (also referred to as a "crude pigment") not subjected to a finishing treatment described below or a pigment having been subjected to the finishing treatment.

The halogenated metal phthalocyanine pigments that belong to the first group and the second group can be represented by a general formula (PIG-1) below.

[Chem. 19]

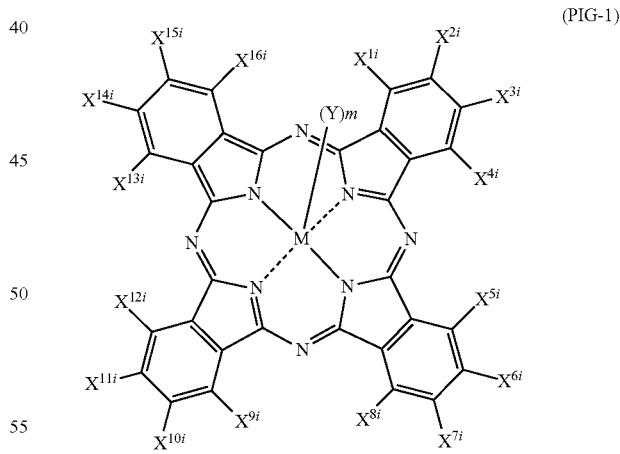

(PIG-1)

In the general formula (PIG-1), the halogenated metal phthalocyanine pigment that belongs to the first group is as follows.

In the general formula (PIG-1), $X^{1i}$ to $X^{16i}$ represent a hydrogen atom, a chlorine atom, a bromine atom, or an iodine atom. Four X atoms that are bonded to a single benzene ring may be the same or different. Among $X^{1i}$ to $X^{16i}$ that are bonded to four benzene rings, 8 to 16 of them are chlorine atoms, bromine atoms, or iodine atoms. M represents a central metal. Among halogenated metal phthalocyanine pigments having the same Y, which will be described below, and the same number m of Y, pigments having chlorine atoms, bromine atoms, and iodine atoms in a total number of less than 8 among 16 atoms of $X^{1i}$ to $X^{16i}$ assume blue, and pigments having chlorine atoms, bromine atoms, and iodine atoms in a total number of 8 or more among 16 atoms of $X^{1i}$ to $X^{16i}$ assume more yellowish as the total number increases. Y that is bonded to the central metal M is a monovalent atomic group selected from the group consisting of a halogen atom such as fluorine, chlorine, bromine, or iodine, an oxygen atom, a hydroxy group, and a sulfonic group; and m represents the number of Y that is bonded to the central metal M, m being an integer of 0 to 2.

The value of m is determined on the basis of the valence of the central metal M. In a case where the central metal M is a trivalent metal such as Al, Sc, Ga, Y, or In, m=1 and any one group selected from the group consisting of fluorine, chlorine, bromine, iodine, a hydroxy group, and a sulfonic group is bonded to the central metal. In a case where the central metal M is a tetravalent metal such as Si, Ti, V, Ge, Zr, or Sn, m=2 and one oxygen atom is bonded to the central metal or two groups each selected from the group consisting of fluorine, chlorine, bromine, iodine, a hydroxy group, and a sulfonic group are bonded to the central metal. In a case where the central metal M is a divalent metal such as Mg, Fe, Co, Ni, Zn, Cu, Zr, Sn, or Pb, Y is not present.

In the general formula (PIG-1) above, the halogenated metal phthalocyanine pigment that belongs to the second group is as follows.

In the general formula (PIG-1), $X^{1i}$ to $X^{16i}$ have the same definition as above; the central metal M represents a trivalent metal selected from the group consisting of Al, Sc, Ga, Y, and In; m represents 1; and Y represents the following atomic group.

[Chem. 20]

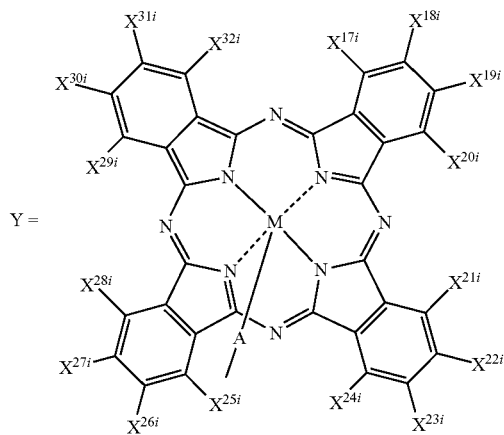

In the chemical structure of the atomic group Y, the central metal M has the same definition as above and $X^{17i}$ to $X^{32i}$ have the same definition as that of $X^{1i}$ to $X^{16i}$ described above in the general formula (PIG-1). A represents a divalent atomic group selected from the group consisting of an oxygen atom, a sulfur atom, sulfinyl (—SO—), and sulfonyl (—SO2-). M in the general formula (PIG-1) and M in the atomic group Y are bonded to each other through the divalent atomic group A.

In other words, the halogenated metal phthalocyanine pigment that belongs to the second group is composed of a halogenated metal phthalocyanine dimer including, as constitutional units, two molecules of a halogenated metal phthalocyanine, the two molecules being bonded to each other through the divalent atomic group.

Specific examples of the halogenated metal phthalocyanine pigment represented by the general formula (PIG-1) include the following (1) to (4).

(1) A halogenated metal phthalocyanine pigment such as a halogenated copper phthalocyanine pigment, a halogenated tin phthalocyanine pigment, a halogenated nickel phthalocyanine pigment, or a halogenated zinc phthalocyanine pigment, in which the central metal is a divalent metal selected from the group consisting of Mg, Fe, Co, Ni, Zn, Cu, Zr, Sn, and Pb and 8 to 16 halogen atoms per molecule of phthalocyanine are bonded to four benzene rings. Note that, among the phthalocyanine pigments, a chlorinated/brominated zinc phthalocyanine pigment, which corresponds to C.I. Pigment Green 58, is particularly preferred.

(2) A halogenated metal phthalocyanine pigment such as a halogenated chloroaluminum phthalocyanine, in which the central metal is a trivalent metal selected from the group consisting of Al, Sc, Ga, Y, and In, the central metal has any one of a halogen atom, a hydroxy group, and a sulfonic group, and 8 to 16 halogen atoms per molecule of phthalocyanine are bonded to four benzene rings.

(3) A halogenated metal phthalocyanine pigment such as a halogenated oxytitanium phthalocyanine or a halogenated oxyvanadium phthalocyanine, in which the central metal is a tetravalent metal selected from the group consisting of Si, Ti, V, Ge, Zr, and Sn, the central metal has one oxygen atom or two selected from halogen atoms, hydroxy groups, and sulfonic groups, the selected two being the same or different, and 8 to 16 halogen atoms per molecule of phthalocyanine are bonded to four benzene rings.

(4) A pigment composed of a halogenated metal phthalocyanine dimer, such as a halogenated µ-oxo-aluminum phthalocyanine dimer or a halogenated µ-thio-aluminum phthalocyanine dimer, that includes, as constitutional units, two molecules of a halogenated metal phthalocyanine having, as a central metal, a trivalent metal selected from the group consisting of Al, Sc, Ga, Y and In and having a structure in which 8 to 16 halogen atoms per molecule of phthalocyanine are bonded to four benzene rings, the central metals of the constitutional units being bonded to each other through a divalent atomic group selected from the group consisting of an oxygen atom, a sulfur atom, sulfinyl, and sulfonyl.

Specifically, the halogenated metal phthalocyanine pigment is preferably at least one selected from C.I. Pigment Green 7, 36, and 58, more preferably at least one selected from Green 36 and 58. Specifically, the phthalocyanine-based green dye is preferably at least one selected from C.I. Solvent Green 4, 5, 7, and 28. Specifically, the phthalocyanine-based blue dye is preferably at least one selected from C.I. Solvent Blue 4, 5, 25, 35, 36, 38, 58, 59, 67, and 70, more preferably at least one selected from Blue 25, 38, 67, and 70. Specifically, the azo-based yellow organic dye is preferably at least one selected from C.I. Solvent Yellow 2, 4, 14, 16, 18, 21, 56, 72, 124, 162, and 163, more preferably at least one selected from Yellow 82 and 162.

(B Pixel Portion)

The B pixel portion preferably contains at least one selected from the group consisting of an ∈-type copper phthalocyanine pigment, a triarylmethane pigment, and a cationic blue organic dye. As the cationic blue organic dye, C.I. Solvent Blue 7 is preferably contained. The ∈-type copper phthalocyanine pigment is preferably C.I. Pigment Blue 15:6.

The triarylmethane pigment is preferably represented by the following general formula (1).

[Chem. 21]

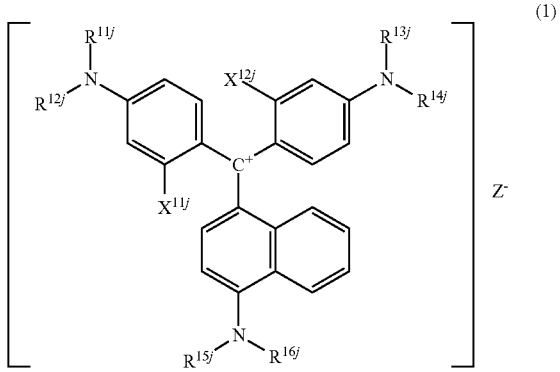

(In the formula, $R^{1j}$ to $R^{16j}$ each independently represent a hydrogen atom, an alkyl group having 1 to 8 carbons that may be substituted, or an aryl group that may be substituted; in a case where $R^{1j}$ to $R^{16j}$ represent an alkyl group that may be substituted, neighboring $R^{11j}$ and $R^{12j}$, $R^{13j}$ and $R^{14j}$, and $R^{15j}$ and $R^{16j}$ may be bonded so as to form ring structures; $X^{11j}$ and $X^{12j}$ each independently represent a hydrogen atom, a halogen atom, or an alkyl group having 1 to 8 carbons that may be substituted; $Z^-$ represents at least one anion selected from a heteropolyoxometalate anion represented by $(P_2Mo_yW_{18-y}O_{62})^{6-}/6$ where y represents an integer of 0, 1, 2, or 3, a heteropolyoxometalate anion represented by $(SiMoW_{11}O_{40})^{4-}/4$, and a lacunary Dawson phosphotungstic heteropolyoxometalate anion; and, in a case where a single molecule contains a plurality of the formula (1), the plurality of the formula (1) may represent the same structure or different structures).

In the general formula (1), $R^{1j}$ to $R^{16j}$ may be the same or different. Accordingly, an —NRR (RR represents any one combination of $R^{11j}R^{12j}$, $R^{13j}R^{14j}$, and $R^{15j}R^{16j}$) group may be symmetrical or asymmetrical.

In a case where neighboring R's (R's are among $R^{11j}$ to $R^{16j}$) are bonded so as to form rings, these rings may be formed via hetero atoms. Specific examples of the rings are illustrated below. These rings may be substituted.

[Chem. 22]

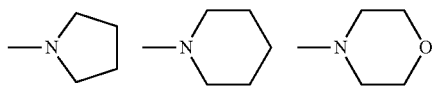

From the standpoint of chemical stability, $R^{1j}$ to $R^{16j}$ preferably each independently represent a hydrogen atom, an alkyl group that may be substituted, or an aryl group that may be substituted.

In particular, more preferably, $R^{1j}$ to $R^{16j}$ each independently represent a hydrogen atom; an alkyl group such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, or a 2-ethylhexyl group; or an aryl group such as a phenyl group or a naphthyl group.

In a case where $R^{1j}$ to $R^{16j}$ represent an alkyl group or an aryl group, the alkyl group or the aryl group may have a desired substituent. Examples of the desired substituent that the alkyl group or the aryl group may have include the following [substituent group Y].

[Substituent Group Y]

Examples include alkyl groups such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, and a 2-ethylhexyl group; aryl groups such as a phenyl group and a naphthyl group; halogen atoms such as a fluorine atom and a chlorine atom; a cyano group; a hydroxy group; alkoxy groups having 1 to 8 carbon atoms such as a methoxy group, an ethoxy group, a propoxy group, and a butoxy group; amino groups that may be substituted such as an amino group, a diethylamino group, a dibutylamino group, and an acetylamino group; acyl groups such as an acetyl group and a benzoyl group; and acyloxy groups such as an acetyloxy group and a benzoyloxy group.

$R^{1j}$ to $R^{16j}$ more preferably represent alkyl groups that have 1 to 8 carbon atoms and may have substituents. Specific examples include unsubstituted alkyl groups such as a methyl group, an ethyl group, a propyl group, an isopropyl group, a butyl group, an isobutyl group, a sec-butyl group, a pentyl group, a hexyl group, and a 2-ethylhexyl group; alkoxyalkyl groups such as a 2-methoxyethyl group and a 2-ethoxyethyl group; acyloxy groups such as a 2-acetyloxyethyl group; cyanoalkyl groups such as a 2-cyanoethyl group; and fluoroalkyl groups such as a 2,2,2-trifluoroethyl group and a 4,4,4-trifluorobutyl group.

In a case where $X^{11j}$ and $X^{12j}$ represent such an alkyl group, the alkyl group may have a desired substituent. Examples of such a substituent include halogen atoms such as a fluorine atom, a chlorine atom, a bromine atom, and an iodine atom; and alkoxy groups such as a methoxy group, an ethoxy group, and a propoxy group. Specific examples of $X^{11j}$ and $X^{12j}$ include haloalkyl groups such as a fluoromethyl group, a trifluoromethyl group, a trichloromethyl group, and 2,2,2-trifluoroethyl group; and alkoxyalkyl groups such as a methoxymethyl group.

$X^{11j}$ and $X^{12j}$ preferably represent a substituent that causes such appropriate steric hindrance that does not affect torsion, such as a hydrogen atom, a methyl group, a chlorine atom, or a trifluoromethyl group. $X^{11j}$ and $X^{12j}$ most preferably represent a hydrogen atom, a methyl group, or a chlorine atom from the standpoint of color tone and heat resistance.

$Z^-$ represents at least one anionic triarylmethane compound selected from a heteropolyoxometalate anion represented by $(P_2Mo_yW_{18-y}O_{62})^{6-}/6$ where y represents an integer of 0, 1, 2, or 3, a heteropolyoxometalate anion represented by $(SiMoW_{11}O_{40})^{4-}/4$, and a lacunary Dawson phosphotungstic heteropolyoxometalate anion. Specifically, the lacunary Dawson phosphotungstic acid is preferably monolacunary Dawson phosphotungstic heteropolyoxometalate anion $(P_2W_{17}O_{61})^{10-}/10$ from the standpoint of durability.

Specific examples of a triarylmethane pigment represented by the general formula (1) include compounds described in Tables 1 to 7 below; however, the present invention is not limited to these compounds without departing from the spirit and scope of the present invention.

TABLE 1

| No. | $R^{11j}$ | $R^{12j}$ | $R^{13j}$ | $R^{14j}$ | $R^{15j}$ | $R^{16j}$ | $X^{11j}$ | $X^{12j}$ | Z- |
|---|---|---|---|---|---|---|---|---|---|
| 1 | C2H5– | C2H5– | C2H5– | C2H5– | C2H5– | H | H | H | (P2W18O62)6– |
| 2 | C2H5– | C2H5– | C2H5– | C2H5– | C2H5– | H | H | H | (P2MoW17O62)6– |
| 3 | C2H5– | C2H5– | C2H5– | C2H5– | C2H5– | H | H | H | (P2Mo2W16O62)6– |
| 4 | C2H5– | C2H5– | C2H5– | C2H5– | C2H5– | H | H | H | (P2Mo3W15O62)6– |
| 5 | C2H5– | C2H5– | C2H5– | C2H5– | C2H5– | H | H | H | (SiMoW11O40)4– |
| 6 | C2H5– | C2H5– | C2H5– | C2H5– | C2H5– | H | H | H | (P2W17O61)10– |
| 7 | CH3– | CH3– | CH3– | CH3– | C2H5– | H | H | H | (P2W18O62)6 |
| 8 | CH3– | CH3– | CH3– | CH3– | C2H5– | H | H | H | (P2MoW17O62)6– |
| 9 | CH3– | CH3– | CH3– | CH3– | C2H5– | H | H | H | (P2Mo3W15O62)6– |

TABLE 2

| No. | $R^{11j}$ | $R^{12j}$ | $R^{13j}$ | $R^{14j}$ | $R^{15j}$ | $R^{16j}$ | $X^{11j}$ | $X^{12j}$ | Z- |
|---|---|---|---|---|---|---|---|---|---|
| 10 | CH3– | CH3– | CH3– | CH3– | C2H5– | H | H | H | (P2Mo3W15O62)6 |
| 11 | CH3– | CH3– | CH3– | CH3– | C2H5– | H | H | H | (SiMoW11O40)4– |
| 12 | CH3– | CH3– | CH3– | CH3– | C2H5– | H | H | H | (P2W17O61)10– |
| 13 | CH3– | CH3– | CH3– | CH3– | Ph– | H | H | H | (P2W18O62)6– |
| 14 | CH3– | CH3– | CH3– | CH3– | Ph– | H | H | H | (P2MoW17O62)6– |
| 15 | CH3– | CH3– | CH3– | CH3– | Ph– | H | H | H | (P2Mo2W16O62)6– |
| 16 | CH3– | CH3– | CH3– | CH3– | Ph– | H | H | H | (P2Mo3W15O62)6– |
| 17 | CH3– | CH3– | CH3– | CH3– | Ph– | H | H | H | (SiMoW11O40)4– |
| 18 | CH3– | CH3– | CH3– | CH3– | Ph– | H | H | H | (P2W17O61)10– |

TABLE 3

| No. | $R^{11j}$ | $R^{12j}$ | $R^{13j}$ | $R^{14j}$ | $R^{15j}$ | $R^{16j}$ | $X^{11j}$ | $X^{12j}$ | Z- |
|---|---|---|---|---|---|---|---|---|---|
| 19 | CH3– | CH3– | CH3– | CH3– | Ph– | CH3– | H | H | (P2W18O62)6– |
| 20 | CH3– | CH3– | CH3– | CH3– | Ph– | CH3– | H | H | (P2MoW17O62)6– |
| 21 | CH3– | CH3– | CH3– | CH3– | Ph– | CH3– | H | H | (P2Mo2W16O62)6– |
| 22 | CH3– | CH3– | CH3– | CH3– | Ph– | CH3– | H | H | (P2Mo3W15O62)6– |
| 23 | CH3– | CH3– | CH3– | CH3– | Ph– | CH3– | H | H | (SiMoW11O40)4– |
| 24 | CH3– | CH3– | CH3– | CH3– | Ph– | CH3– | H | H | (P2W17O61)10– |
| 25 | n-C3H7– | n-C3H7– | n-C3H7– | n-C3H7– | C2H5– | H | H | H | (P2W18O62)6– |
| 26 | n-C3H7– | n-C3H7– | n-C3H7– | n-C3H7– | C2H5– | H | H | H | (P2MoW17O62)6– |
| 27 | n-C3H7– | n-C3H7– | n-C3H7– | n-C3H7– | C2H5– | H | H | H | (P2Mo2W16O62)6– |

TABLE 4

| No. | $R^{11j}$ | $R^{12j}$ | $R^{13j}$ | $R^{14j}$ | $R^{15j}$ | $R^{16j}$ | $X^{11j}$ | $X^{12j}$ | Z- |
|---|---|---|---|---|---|---|---|---|---|
| 28 | C2H5– | C2H5– | C2H5– | C2H5– | C2H5– | H | CH3– | H | (P2W18O62)6– |
| 29 | C2H5– | C2H5– | C2H5– | C2H5– | C2H5– | H | CH3– | H | (P2MoW17O62)6– |
| 30 | C2H5– | C2H5– | C2H5– | C2H5– | C2H5– | H | CH3– | H | (P2Mo2W16O62)6– |
| 31 | C2H5– | C2H5– | C2H5– | C2H5– | C2H5– | H | CH3– | H | (P2Mo3W15O62)6– |
| 32 | C2H5– | C2H5– | C2H5– | C2H5– | C2H5– | H | CH3– | H | (SiMoW11O40)4– |
| 33 | C2H5– | C2H5– | C2H5– | C2H5– | C2H5– | H | CH3– | H | (P2W17O61)10– |
| 34 | C2H5– | C2H5– | C2H5– | C2H5– | C2H5– | H | CH3– | CH3– | (P2W18O62)6 |
| 35 | C2H5– | C2H5– | C2H5– | C2H5– | C2H5– | H | CH3– | CH3– | (P2MoW17O62)6– |
| 36 | C2H5– | C2H5– | C2H5– | C2H5– | C2H5– | H | CH3– | CH3– | (P2Mo3W15O62)6– |

TABLE 5

| No. | $R^{11j}$ | $R^{12j}$ | $R^{13j}$ | $R^{14j}$ | $R^{15j}$ | $R^{16j}$ | $X^{11j}$ | $X^{12j}$ | Z- |
|---|---|---|---|---|---|---|---|---|---|
| 37 | C2H5– | C2H5– | C2H5– | C2H5– | C2H5– | H | CH3– | CH3– | (P2Mo3W15O62)6– |
| 38 | C2H5– | C2H5– | C2H5– | C2H5– | C2H5– | H | CH3– | CH3– | (SiMoW11O40)4– |
| 39 | C2H5– | C2H5– | C2H5– | C2H5– | C2H5– | H | CH3– | CH3– | (P2W17O61)10– |
| 40 | C2H5– | C2H5– | C2H5– | C2H5– | C2H5– | H | Cl | H | (P2W18O62)6– |
| 41 | C2H5– | C2H5– | C2H5– | C2H5– | C2H5– | H | Cl | H | (P2MoW17O62)6– |

TABLE 5-continued

| No. | $R^{1j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 42 | C2H5— | C2H5— | C2H5— | C2H5— | C2H5— | H | Cl | H | (P2Mo2W16O62)6— |
| 43 | C2H5— | C2H5— | C2H5— | C2H5— | C2H5— | H | Cl | H | (P2Mo3W15O62)6— |
| 44 | C2H5— | C2H5— | C2H5— | C2H5— | C2H5— | H | Cl | H | (SiMoW11O40)4— |
| 45 | C2H5— | C2H5— | C2H5— | C2H5— | C2H5— | H | Cl | H | (P2W17O61)10— |

TABLE 6

| No. | $R^{1j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 46 | C2H5— | C2H5— | C2H5— | C2H5— | C2H5— | C2H5— | H | H | (P2W18O62)6— |
| 47 | C2H5— | C2H5— | C2H5— | C2H5— | C2H5— | C2H5— | H | H | (P2MoW17O62)6— |
| 48 | C2H5— | C2H5— | C2H5— | C2H5— | C2H5— | C2H5— | H | H | (P2Mo2W16O62)6— |
| 49 | C2H5— | C2H5— | C2H5— | C2H5— | C2H5— | C2H5— | H | H | (P2Mo3W15O62)6— |
| 50 | C2H5— | C2H5— | C2H5— | C2H5— | C2H5— | C2H5— | H | H | (SiMoW11O40)4— |
| 51 | C2H5— | C2H5— | C2H5— | C2H5— | C2H5— | C2H5— | H | H | (P2W17O61)10— |
| 52 | cyclopentyl | | cyclopentyl | | C2H5— | H | H | H | (P2W18O62)6— |
| 53 | | cyclopentyl | | cyclopentyl | C2H5— | H | H | H | (P2MoW17O62)6— |
| 54 | cyclopentyl | | cyclopentyl | | C2H5— | H | H | H | (P2Mo2W16O62)6— |

TABLE 7

| No. | $R^{1j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 55 | cyclopentyl | | cyclopentyl | | C2H5— | H | H | H | (P2Mo3W15O62)6— |
| 56 | cyclopentyl | | cyclopentyl | | C2H5— | H | H | H | (SiMoW11O40)4— |
| 57 | cyclopentyl | | cyclopentyl | | C2H5— | H | H | H | (P2W17O61)10— |
| 58 | 4,4,4-trifluorobutyl | 4,4,4-trifluorobutyl | C2H5— | C2H5— | C2H5— | H | H | H | (P2W18O62)6— |
| 59 | 4,4,4-trifluorobutyl | 4,4,4-trifluorobutyl | C2H5— | C2H5— | C2H5— | H | H | H | (P2MoW17O62)6— |
| 60 | 4,4,4-trifluorobutyl | 4,4,4-trifluorobutyl | C2H5— | C2H5— | C2H5— | H | H | H | (SiMoW11O40)4— |
| 61 | 4,4,4-trifluorobutyl | 4,4,4-trifluorobutyl | C2H5— | C2H5— | C2H5— | H | CH3— | H | (P2W18O62)6— |
| 62 | 4,4,4-trifluorobutyl | 4,4,4-trifluorobutyl | C2H5— | C2H5— | C2H5— | H | CH3 | H | (P2MoW17O62)6— |
| 63 | 4,4,4-trifluorobutyl | 4,4,4-trifluorobutyl | C2H5— | C2H5— | C2H5— | H | CH3 | H | ((SiMoW11O40)4— |

The RGB three-color pixel portions preferably contain, as a coloring material in the R pixel portion, C.I. Pigment Red 254 having an average primary particle size of 5 to 50 nm measured by a small angle X-ray scattering method; as a coloring material in the G pixel portion, a mixture of C.I. Solvent Blue 67 and C.I. Solvent Yellow 82 and/or 162; and, as a coloring material in the B pixel portion, a triarylmethane pigment represented by the general formula (1).

The RGB three-color pixel portions also preferably contain, as a coloring material in the R pixel portion, C.I. Pigment Red 254 having an average primary particle size of 5 to 50 nm measured by a small angle X-ray scattering method; as a coloring material in the G pixel portion, at least one selected from C.I. Pigment Green 7, 36, and 58; and, as a coloring material in the B pixel portion, a triarylmethane pigment represented by the general formula (1).

The RGB three-color pixel portions preferably further contain, as a coloring material in the R pixel portion, at least one organic dye or pigment selected from the group consisting of C.I. Pigment Red 177, 242, 166, 167, and 179, C.I. Pigment Orange 38 and 71, C.I. Pigment Yellow 150, 215, 185, 138, and 139, C.I. Solvent Red 89, C.I. Solvent Orange 56, and C.I. Solvent Yellow 21, 82, 83:1, 33, and 162.

The RGB three-color pixel portions preferably further contain, as a coloring material in the G pixel portion, at least one organic dye or pigment selected from the group consisting of C.I. Pigment Yellow 150, 215, 185, and 138 and C.I. Solvent Yellow 21, 82, 83:1, and 33.

The RGB three-color pixel portions preferably further contain, as a coloring material in the B pixel portion, at least one organic dye or pigment selected from the group consisting of C.I. Pigment Blue 1, C.I. Pigment Violet 23, C.I. Basic Blue 7, C.I. Basic Violet 10, C.I. Acid Blue 1, 90, and 83, C.I. Direct Blue 86, and C.I. Pigment Blue 15, 15:1, 15:2, 15:3, 15:4, and 15:6.

It is also preferred that the color filter include a black matrix, the RGB three-color pixel portions, and a Y pixel portion, and the Y pixel portion contain, as a coloring material, at least one yellow organic dye or pigment selected from the group consisting of C.I. Pigment Yellow 150, 215, 185, 138, and 139 and C.I. Solvent Yellow 21, 82, 83:1, 33, and 162.

In a color filter according to the present invention, the chromaticity x and chromaticity y in the XYZ color system of each pixel portion with use of a C light source are preferably as follows from the viewpoint of preventing a decrease in the voltage holding ratio (VHR) and an increase in the ion density (ID) in the liquid crystal layer and suppressing problems of display defects such as white streaks, variations in alignment, and image sticking.

In the XYZ color system of the R pixel portion with use of a C light source, the chromaticity x is preferably 0.58 to 0.69 and more preferably 0.62 to 0.68 and the chromaticity y is preferably 0.31 to 0.36 and more preferably 0.32 to 0.35. More preferably, the chromaticity x is 0.58 to 0.69 and the chromaticity y is 0.31 to 0.36. More preferably, the chromaticity x is 0.62 to 0.68 and the chromaticity y is 0.32 to 0.35.

In the XYZ color system of the G pixel portion with use of a C light source, the chromaticity x is preferably 0.19 to 0.35 and more preferably 0.20 to 0.26 and the chromaticity y is preferably 0.54 to 0.76 and more preferably 0.64 to 0.73. More preferably, the chromaticity x is 0.19 to 0.35 and the chromaticity y is 0.54 to 0.76. More preferably, the chromaticity x is 0.20 to 0.26 and the chromaticity y is 0.64 to 0.73.

In the XYZ color system of the B pixel portion with use of a C light source, the chromaticity x is preferably 0.12 to 0.19 and more preferably 0.12 to 0.17 and the chromaticity y is preferably 0.04 to 0.14 and more preferably 0.05 to 0.12. More preferably, the chromaticity x is 0.11 to 0.19 and the chromaticity y is 0.04 to 0.14. More preferably, the chromaticity x is 0.12 to 0.17 and the chromaticity y is 0.05 to 0.12.

In the XYZ color system of the Y pixel portion with use of a C light source, the chromaticity x is preferably 0.46 to 0.50 and more preferably 0.47 to 0.48 and the chromaticity y is preferably 0.48 to 0.53 and more preferably 0.50 to 0.52. More preferably, the chromaticity x is 0.46 to 0.50 and the chromaticity y is 0.48 to 0.53. More preferably, the chromaticity x is 0.47 to 0.48 and the chromaticity y is 0.50 to 0.52.

Herein, the XYZ color system is a color system approved as the standard color system by the CIE (International Commission on Illumination) in 1931.

Such chromaticity in each pixel portion can be adjusted by changing the types of dyes and pigments used and the mixing ratio of the dyes and pigments. For example, in the case of the R pixel, the chromaticity can be adjusted by adding an appropriate amount of a yellow dye/pigment and/or an orange pigment to the red dye/pigment. In the case of the G pixel, the chromaticity can be adjusted by adding an appropriate amount of a yellow dye/pigment to the green dye/pigment. In the case of the B pixel, the chromaticity can be adjusted by adding an appropriate amount of a purple dye/pigment or a yellowish blue dye/pigment to the blue dye/pigment. The chromaticity can also be adjusted by appropriately controlling the particle size of a pigment.

In the color filter, color filter pixel portions can be formed by a publicly known method. A representative example of a method for forming pixel portions is a photolithography method. In this method, a photo-curable composition described below is applied onto a black-matrix-side surface of a transparent substrate for color filters and dried by performing heating (pre-baked); pattern exposure is then performed by irradiating the photo-curable composition with ultraviolet rays through a photomask to cure the photo-curable compound in portions corresponding to pixel portions; and unexposed portions are then developed with a developer to remove portions other than the pixel portions, whereby the pixel portions are fixed on the transparent substrate. In this method, pixel portions composed of a cured colored coating film of the photo-curable composition are formed on the transparent substrate.

The photo-curable composition described below is prepared for each of the R pixel, G pixel, B pixel, and optionally other pixels of different colors, such as the Y pixel and the above-described process is repeatedly performed. Thus, a color filter including colored pixel portions of the R pixel, G pixel, B pixel, and Y pixel at predetermined positions can be produced.

Examples of a method for applying the photo-curable composition described below onto the transparent substrate composed of glass or the like include a spin coating method, a slit coating method, a roll coating method, and an ink-jet method.

The drying conditions of the coating film of the photo-curable composition applied onto the transparent substrate are normally 50° C. to 150° C. and about 1 to 15 minutes though depending on, for example, the types of components and the mixing ratio. The light used for the photo-curing of the photo-curable composition is preferably ultraviolet light or visible light in a wavelength range of 200 to 500 nm. Various light sources that emit light in this wavelength range can be used.

Examples of a developing method include a puddling method, a dipping method, and a spraying method. After the exposure and development of the photo-curable composition, the transparent substrate on which pixel portions of necessary colors have been formed is washed with water and dried. The thus-produced color filter is heat-treated (post-baked) at 90° C. to 280° C. for a predetermined time using a heating device such as a hot plate, an oven, or the like to remove volatile components in the colored coating film and, at the same time, heat-cure an unreacted photo-curable compound remaining in the cured colored coating film of the photo-curable composition, whereby the color filter is completed.

By using a coloring material for a color filter of the present invention together with a liquid crystal composition of the present invention, there can be provided a liquid crystal display device in which a decrease in the voltage holding ratio (VHR) and an increase in the ion density (ID) in the liquid crystal layer are prevented and problems of display defects such as white streaks, variations in alignment, and image sticking are resolved.

In general, the photo-curable composition is produced by the method below. A dye and/or pigment composition for a color filter of the present invention, an organic solvent, and a dispersant serving as essential components are stirred and dispersed so as to be uniformly mixed with each other in order to prepare a pigment dispersion liquid for forming a pixel portion of a color filter. A photo-curable compound and optionally a thermoplastic resin, a photopolymerization initiator, and the like are added to the pigment dispersion liquid to produce the photo-curable composition.

Examples of the organic solvent used herein include aromatic solvents such as toluene, xylene, and methoxybenzene; acetate solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate; propionate solvents such as ethoxyethyl propionate; alcohol solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethyl formamide, γ-butyrolactam, N-methyl-2-pyrrolidone, aniline, and pyridine; lactone solvents such as γ-butyrolactone; and carbamates such as a mixture containing methyl carbamate and ethyl carbamate in a ratio of 48:52.

Examples of the dispersant used herein include DISPER-BYK 130, DISPERBYK 161, DISPERBYK 162, DISPER-BYK 163, DISPERBYK 170, DISPERBYK 171, DISPER-BYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPER-BYK 2096, DISPERBYK 2150, DISPERBYK LPN21116, and DISPERBYK LPN6919 manufactured by BYK-Chemie GmbH; Efka 46, Efka 47, Efka 452, Efka LP4008, Efka 4009, Efka LP4010, Efka LP4050, LP4055, Efka 400, Efka 401, Efka 402, Efka 403, Efka 450, Efka 451, Efka 453, Efka 4540, Efka 4550, Efka LP4560, Efka 120, Efka 150, Efka 1501, Efka 1502, and Efka 1503 manufactured by Efka Chemicals Company; Solsperse 3000, Solsperse 9000, Solsperse 13240, Solsperse 13650, Solsperse 13940, Solsperse 17000, 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000 manufactured by Lubrizol Corporation; Ajisper PB711, Ajisper PB821, Ajisper PB822, Ajisper PB814, Ajisper PN411, and Ajisper PA111 manufactured by Ajinomoto Co., Ltd.; and synthetic resins which are liquid and water-insoluble at room temperature, e.g., acrylic resins, urethane resins, alkyd resins, natural rosins such as wood rosin, gum rosin, and tall oil rosin, modified rosins such as polymerized rosin, disproportionated rosin, hydrogenated rosin, oxidized rosin, and maleated rosin, and rosin derivatives such as rosin amine, lime rosin, rosin alkylene oxide adducts, rosin alkyd adducts, and rosin-modified phenol. The addition of these dispersants and resins contributes to a reduction in flocculation, an improvement in the dispersion stability of pigments, and an improvement in the viscous property of dispersions.

Examples of a dispersion aid that can be contained include organic pigment derivatives such as phthalimidemethyl derivatives, sulfonic acid derivatives, N-(dialkylamino)methyl derivatives, and N-(dialkylaminoalkyl)sulfonamide derivatives. It is obvious that two or more different types of these derivatives can be used in combination.

Examples of the thermoplastic resin used to prepare the photo-curable composition include urethane resins, acrylic resins, polyamide resins, polyimide resins, styrene-maleic acid resins, and styrene-maleic anhydride resins.

Examples of the photo-curable compound include bifunctional monomers such as 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate; polyfunctional monomers having a relatively low molecular weight, such as trimethylolpropane triacrylate, pentaerythritol triacrylate, tris[2-(meth)acryloyloxyethyl]isocyanurate, dipentaerythritol hexaacrylate, and dipentaerythritol pentaacrylate; and polyfunctional monomers having a relatively high molecular weight, such as polyester acrylates, polyurethane acrylates, and polyether acrylates.

Examples of the photopolymerization initiator include acetophenone, benzophenone, benzyldimethyl ketanol, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of a commercially available photopolymerization initiator include "Irgacure (trademark)-184", "Irgacure (trademark)-369", and "Darocur (trademark)-1173" manufactured by BASF; "Lucirin-TPO" manufactured by BASF; "Kayacure (trademark) DETX" and "Kayacure (trademark) OA" manufactured by Nippon Kayaku Co., Ltd.; "Vicure 10" and "Vicure 55" manufactured by Stauffer; "Trigonal PI" manufactured by Akzo; "Sandoray 1000" manufactured by Sandoz Ltd.; "DEAP" manufactured by Upjohn Company; and "Biimidazole" manufactured by Kurogane Kasei Co., Ltd.

A publicly known and commonly used photosensitizer can also be used together with the photopolymerization initiator. Examples of the photosensitizer include amines, urea compounds, compounds containing a sulfur atom, compounds containing a phosphorus atom, compounds containing a chlorine atom, nitriles, and other compounds containing a nitrogen atom. They can be used alone or in combination of two or more thereof.

The mixing ratio of the photopolymerization initiator added is not particularly limited, but is preferably in the range of 0.1% to 30% by mass relative to the compound having a photo-polymerizable or photo-curable functional group. In a case where the ratio is less than 0.1%, the sensitivity during photocuring tends to decrease. In a case where the ratio is more than 30%, a crystal of the photopolymerization initiator is precipitated during drying of a pigment dispersion resist coating film and thus the physical properties of the coating film may be degraded.

A photo-curable composition for forming a pixel portion of a color filter can be prepared using the materials described above. Specifically, 300 to 1000 parts by mass of the organic solvent and 1 to 100 parts by mass of the dispersant relative to 100 parts by mass of the dye and/or pigment composition for a color filter of the present invention are stirred and dispersed so as to be uniformly mixed with each other. Thus, the die/pigment liquid can be prepared. Subsequently, 3 to 20 parts by mass in total of the thermoplastic resin and photo-curable compound relative to 1 part by mass of the pigment composition for a color filter of the present invention, 0.05 to 3 parts by mass of the photopolymerization initiator relative to 1 part by mass of the photo-curable compound, and optionally an organic solvent are added to the pigment dispersion liquid and stirred and dispersed so as to be uniformly mixed with each other.

A publicly known and commonly used organic solvent or aqueous alkali solution can be used as the developer. In particular, in a case where the photo-curable composition contains a thermoplastic resin or a photo-curable compound and at least one of the thermoplastic resin and photo-curable compound has an acid value and exhibits alkali solubility, washing with an aqueous alkali solution is effective for formation of color filter pixel portions.

The method for forming color filter pixel portions by a photolithography method has been described in detail. The color filter pixel portions formed by using pigment compositions for a color filter of the present invention may be formed by another method such as an electrodeposition method, a transfer method, a micelle electrolysis method, a PVED (photovoltaic electrodeposition) method, an ink-jet method, a reverse printing method, or a heat curing method, so that a color filter is produced.

(Alignment Film)

In a liquid crystal display device of the present invention, in a case where an alignment film for aligning a liquid crystal composition needs to be formed on surfaces of first and second substrates that contact the liquid crystal composition, the alignment film is disposed between a color filter and a liquid crystal layer. However, the thickness of the alignment film is small and at most 100 nm or less, which does not completely block the interaction between a coloring agent such as a pigment constituting the color filter and a liquid crystal compound constituting the liquid crystal layer.

In a liquid crystal display device that does not use an alignment film, there is a higher degree of interaction between a coloring agent such as a pigment constituting the color filter and a liquid crystal compound constituting the liquid crystal layer.

The alignment film can be composed of a transparent organic material such as polyimide, polyamide, BCB (benzocyclobutene polymer), or polyvinyl alcohol. In particular, the alignment film is preferably a polyimide alignment film formed by imidizing polyamic acid synthesized from a diamine such as an aliphatic or alicyclic diamine, e.g., p-phenylene diamine or 4,4'-diaminodiphenylmethane, and an aliphatic or alicyclic tetracarboxylic acid anhydride such as butanetetracarboxylic acid anhydride or 2,3,5-tricarboxycyclopentylacetic acid anhydride, or an aromatic tetracarboxylic acid anhydride such as pyromellitic acid dianhydride. In this case, the alignment is generally provided by rubbing, but the alignment film can also be used without being provided with alignment when used as a vertical alignment film or the like.

The alignment film can be composed of a material containing chalcone, cinnamate, cinnamoyl, or an azo group in a compound, and such a material may be used in combination with a material such as polyimide and polyamide. In this case, rubbing or an optical alignment technique may be used for the alignment film.

Regarding the alignment film, in general, a resin film is formed by applying the alignment film material onto a substrate by a method such as a spin coating method. Alternatively, a uniaxially stretching method, a Langmuir-Blodgett method, or the like can also be employed.

(Transparent Electrode)

In a liquid crystal display device of the present invention, the transparent electrode can be composed of a material such as a conductive metal oxide. The metal oxide can be indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-added titanium dioxide ($Ti_{1-x}Nb_xO_2$), fluorine-doped tin oxide, graphene nanoribbon, or metal nanowire and is preferably zinc oxide (ZnO), indium tin oxide ($In_2O_3$—$SnO_2$), or indium zinc oxide ($In_2O_3$—ZnO). The transparent conductive film can be patterned by, for example, a photo-etching method or a method that uses a mask.

A liquid crystal display device of the present invention is particularly useful for active matrix driving liquid crystal display devices and can be applied to liquid crystal display devices with a TN mode, an IPS mode, a polymer-stabilized IPS mode, an FFS mode, an OCB mode, a VA mode, or an ECB mode.

The liquid crystal display device, in combination with a backlight, is used in various applications such as monitors of liquid crystal televisions and personal computers, displays of cellular phones and smart phones, notebook computers, mobile information terminals, and digital signage. Examples of the backlight include a cold-cathode tube backlight, and a pseudo-white backlight with two wavelength peaks and a backlight with three wavelength peaks that use a light-emitting diode composed of an inorganic material or an organic EL element.

EXAMPLES

Hereinafter, the present invention will be described further in detail with reference to Examples, but the present invention is not limited to these Examples. In compositions of Examples and Comparative Examples below, "%" means "% by mass".

In Examples, the measured properties are as follows.

$T_{ni}$: nematic phase-isotropic liquid phase transition temperature (° C.)

Δn: refractive index anisotropy at 25° C.

Δ∈: dielectric anisotropy at 25° C.

η: viscosity (mPa·s) at 20° C.

γ1: rotational viscosity (mPa·s) at 25° C.

VHR: voltage holding ratio (%) at 70° C.

(a value, which is expressed as a percentage, of the ratio of a measured voltage to an initial applied voltage, the measured voltage being obtained by injecting a liquid crystal composition into a cell having a thickness of 3.5 μm and performing measurement at an application voltage of 5 V, a frame time of 200 ms, and a pulse duration of 64 μs)

ID: ion density ($pC/cm^2$) at 70° C.

(an ion density obtained by injecting a liquid crystal composition into a cell having a thickness of 3.5 μm and performing measurement at an application voltage of 20 V and a frequency of 0.05 Hz using MTR-1 (manufactured by TOYO Corporation))

Image Sticking:

Image sticking of a liquid crystal display element was evaluated as follows. A predetermined fixed pattern was displayed in a display area for 1000 hours, and a uniform image was then displayed on the full screen. The level of a residual image of the fixed pattern was evaluated through visual inspection on the basis of the four-level criteria described below.

A: No residual image was observed.

B: A residual image was slightly observed, but was at an acceptable level.

C: A residual image was observed, and was at an unacceptable level.

D: A residual image was observed, and was at a very poor level.

In Examples, the following abbreviations are used for the description of compounds.

(Ring Structure)

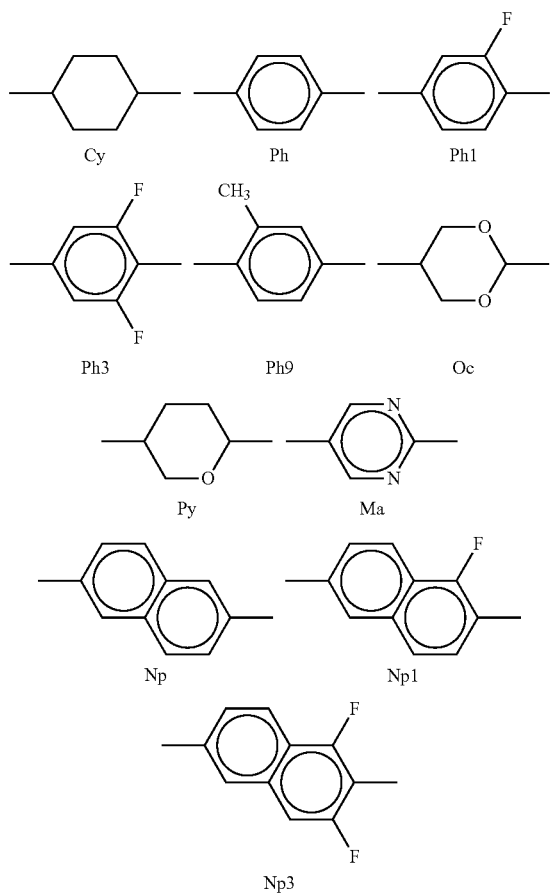

(Side Chain Structure and Linking Structure)

TABLE 8

| | |
|---|---|
| n (number) at end | $C_nH_{2n+1}$— |
| -2- | —$CH_2CH_2$— |
| —1O— | —$CH_2O$— |
| —O1— | —$OCH_2$— |
| —V— | —CO— |
| —VO— | —COO— |
| —CFFO— | —$CF_2O$— |
| —F | —F |
| —Cl | —Cl |
| —CN | —C≡N |
| —OCFFF | —$OCF_3$ |
| —CFFF | —$CF_3$ |
| —On | —$OC_nH_{2n+1}$— |
| -T- | —C≡C— |
| —N— | —CH=N—N=CH— |
| ndm- | $C_nH_{2n+1}$—HC=CH—$(CH_2)_{m-1}$— |
| -ndm | —$(CH_2)_{n-1}$—HC=CH—$C_mH_{2m+1}$ |
| ndmO— | $C_nH_{2n+1}$—HC=CH—$(CH_2)_{m-1}$O— |
| —Ondm | —O—$(CH_2)_{n-1}$—HC=CH—$C_mH_{2m+1}$ |
| -ndm- | —$(CH_2)_{n-1}$—HC=CH—$(CH_2)_{m-1}$— |

[Production of Color Filter]
[Preparation of Colored Composition]
[Red Pigment-Colored Composition 1]

Into a plastic bottle, 10 parts of a red pigment 1 (C.I. Pigment Red 254) having an average primary particle size of 25 nm and a normalized dispersion of 40% measured by a small angle X-ray scattering method was placed; 55 parts of propylene glycol monomethyl ether acetate, 7.0 parts of DISPERBYK LPN21116 (manufactured by BYK-Chemie GmbH), and 0.3 to 0.4 mmϕ zirconia beads "ER-120S" manufactured by Saint-Gobain were added; and they were dispersed with a paint conditioner (manufactured by Toyo Seiki Seisaku-sho, Ltd.) for four hours and then filtered with a 1-μm filter to obtain a pigment dispersion liquid. Then, 75.00 parts of the pigment dispersion liquid, 5.50 parts of polyester acrylate resin (Aronix (trademark) M7100 manufactured by TOAGOSEI CO., LTD.), 5.00 parts of dipentaerythritol hexaacrylate (KAYARAD (trademark) DPHA manufactured by Nippon Kayaku Co., Ltd.), 1.00 part of benzophenone (KAYACURE (trademark) BP-100 manufactured by Nippon Kayaku Co., Ltd.), and 13.5 parts of UCAR Ester EEP were stirred with a mixer and filtered with a filter having a pore size of 1.0 μm to obtain a red pigment-colored composition 1.

Note that the average primary particle size and the particle size distribution of the organic pigment were obtained from a small angle X-ray scattering profile (measured scattering profile) of the organic pigment dispersion based on a small angle X-ray scattering method in Japanese Unexamined Patent Application Publication No. 2006-113042.

[Red Pigment-Colored Composition 2]

A red pigment-colored composition 2 was prepared in the same manner as above, except that 9.95 parts of a red pigment 2 (C.I. Pigment Red 254) having an average primary particle size of 15 nm and a normalized dispersion of 55% measured by the small angle X-ray scattering method and 0.05 parts of a sulfonic acid derivative of diketopyrrolopyrrole were used instead of 10 parts of the red pigment 1 of the red pigment-colored composition 1.

[Red Pigment-Colored Composition 3]

A red pigment-colored composition 3 was prepared in the same manner as above, except that 9.95 parts of a red pigment 3 (C.I. Pigment Red 255) having an average primary particle size of 20 nm and a normalized dispersion of 48% measured by the small angle X-ray scattering method and 0.04 parts of a phthalimidemethyl derivative of dichloroquinacridone were used instead of 10 parts of the red pigment 1 of the red pigment-colored composition 1.

[Red Pigment-Colored Composition 4]

A red pigment-colored composition 4 was prepared in the same manner as above, except that 7.36 parts of a red pigment 3 having an average primary particle size of 10 nm and a normalized dispersion of 60% measured by the small angle X-ray scattering method, 0.64 parts of a sulfonic acid derivative of diaminoanthraquinonyl, and 2 parts of a yellow pigment 2 (C.I. Pigment Yellow 139) were used instead of 10 parts of the red pigment 1 of the red pigment-colored composition 1.

[Green Pigment-Colored Composition 1]

A green pigment-colored composition 1 was prepared in the same manner as above, except that 6 parts of a green pigment 1 (C.I. Pigment Green 36, "FASTOGEN GREEN 2YK-CF" manufactured by DIC Corporation) and 4 parts of a yellow pigment 1 (C.I. Pigment Yellow 150, FANCHON FAST YELLOW E4GN manufactured by BAYER) were used instead of 10 parts of the red pigment 1 of the red pigment-colored composition 1.

[Green Pigment-Colored Composition 2]

A green pigment-colored composition 2 was prepared in the same manner as above, except that 4 parts of a green pigment 2 (C.I. Pigment Green 58, FASTOGEN GREEN A110 manufactured by DIC Corporation) and 6 parts of a yellow pigment 2 (C.I. Pigment Yellow 138) were used instead of 6 parts of the green pigment 1 and 4 parts of the yellow pigment 1 of the green pigment-colored composition 1.

[Blue Pigment-Colored Composition 1]

A blue pigment-colored composition 1 was prepared in the same manner as above, except that 9 parts of a blue pigment 1 (C.I. Pigment Blue 15:6, "FASTOGEN BLUE EP-210" manufactured by DIC Corporation) and 1 part of a purple pigment 1 (C.I. Pigment VIOLET 23) were used instead of 10 parts of the red pigment 1 of the red pigment-colored composition 1.

[Blue Pigment-Colored Composition 2]

Into a plastic bottle, 1.80 parts of a triarylmethane pigment represented by the general formula (1) above (Compound No. 2 in Table 1), 2.10 parts of BYK-2164 (BYK-Chemie GmbH), 11.10 parts of propylene glycol monomethyl ether acetate, and 0.3 to 0.4 mmϕ SEPR beads were placed, and they were dispersed with a paint conditioner (manufactured by Toyo Seiki Seisaku-sho, Ltd.) for four hours to obtain a pigment dispersion liquid. Then, 75.00 parts of the pigment dispersion liquid, 5.50 parts of polyester acrylate resin (Aronix (trademark) M7100 manufactured by TOAGOSEI CO., LTD.), 5.00 parts of dipentaerythritol hexaacrylate (KAYARAD (trademark) DPHA manufactured by Nippon Kayaku Co., Ltd.), 1.00 part of benzophenone (KAYACURE (trademark) BP-100 manufactured by Nippon Kayaku Co., Ltd.), and 13.5 parts of UCAR Ester EEP (manufactured by Union Carbide Corporation) were stirred with a mixer and filtered with a filter having a pore size of 1.0 μm to obtain a blue pigment-colored composition 2.

[Blue Pigment-Colored Composition 3]

A blue pigment-colored composition 3 was prepared in the same manner as above, except that a triarylmethane pigment represented by the general formula (1) above (Compound No. 5 in Table 1) was used instead of the triarylmethane pigment of the blue pigment-colored composition 2.

[Yellow Pigment-Colored Composition 1]

A yellow pigment-colored composition 1 was prepared in the same manner as above, except that 10 parts of a yellow pigment 1 (C.I. Pigment Yellow 150, FANCHON FAST YELLOW E4GN manufactured by LANXESS) was used instead of 10 parts of the red pigment 1 of the red pigment-colored composition 1.

[Red Dye-Colored Composition 1]

Into a plastic bottle, 10 parts of a red dye 1 (C.I. Solvent Red 1) was placed; 55 parts of propylene glycol monomethyl ether acetate and 0.3 to 0.4 mmϕ SEPR beads were added; and they were dispersed with a paint conditioner (manufactured by Toyo Seiki Seisaku-sho, Ltd.) for four hours and then filtered with a 5-μm filter to obtain a dye-colored liquid. Then, 75.00 parts of the dye-colored liquid, 5.50 parts of polyester acrylate resin (Aronix (trademark) M7100 manufactured by TOAGOSEI CO., LTD.), 5.00 parts of dipentaerythritol hexaacrylate (KAYARAD (trademark) DPHA manufactured by Nippon Kayaku Co., Ltd.), 1.00 part of benzophenone (KAYACURE (trademark) BP-100 manufactured by Nippon Kayaku Co., Ltd.), and 13.5 parts of UCAR Ester EEP were stirred with a mixer and filtered with a filter having a pore size of 1.0 μm to obtain a red dye-colored composition 1.

[Green Dye-Colored Composition 1]

A green dye-colored composition 1 was prepared in the same manner as above, except that 3 parts of a blue dye 1 (C.I. Solvent Blue 67) and 7 parts of a yellow dye 1 (C.I. Solvent Yellow 162) were used instead of 10 parts of the red dye 1 of the red dye-colored composition 1.

[Green Dye-Colored Composition 2]

A green dye-colored composition 2 was prepared in the same manner as above, except that 4 parts of a yellow dye 1 (C.I. Solvent Yellow 162) and 3 parts of a yellow dye 3 (C.I. Solvent Yellow 82) were used instead of 7 parts of the yellow dye 1 of the green dye-colored composition 1.

[Green Dye-Colored Composition 3]

A green dye-colored composition 3 was prepared in the same manner as above, except that 10 parts of a green dye 1 (C.I. Solvent Green 7) was used instead of 3 parts of the blue dye 1 and 7 parts of the yellow dye 1 of the green dye-colored composition 1.

[Yellow Dye-Colored Composition 1]

A yellow dye-colored composition 1 was prepared in the same manner as above, except that 10 parts of a yellow dye 1 (C.I. Solvent Yellow 21) was used instead of 10 parts of the red dye 1 of the red dye-colored composition 1.

[Yellow Dye-Colored Composition 2]

A yellow dye-colored composition 2 was prepared in the same manner as above, except that 10 parts of a yellow dye 4 (C.I. Solvent Yellow 2) was used instead of 10 parts of the yellow dye 1 of the yellow dye-colored composition 1.

[Blue Dye-Colored Composition 1]

A blue dye-colored composition 1 was prepared in the same manner as above, except that 10 parts of a blue dye 1 (C.I. Solvent Blue 7) was used instead of the red dye 1 of the red dye-colored composition 1.

[Blue Dye-Colored Composition 2]

A blue dye-colored composition 2 was prepared in the same manner as above, except that 10 parts of a blue dye 2 (C.I. Solvent Blue 12) was used instead of 10 parts of the blue dye 1 of the blue dye-colored composition 1.

[Production of Color Filter]

The red colored composition was applied by spin coating onto a glass substrate on which a black matrix was formed in advance, so as to form a film having a thickness of 2 μm. The film was dried at 70° C. for 20 minutes and then exposed to ultraviolet rays through a photomask in a striped pattern using an exposure device equipped with an ultrahigh-pressure mercury lamp. The film was subjected to spray development with an alkali developer for 90 seconds, washed with ion-exchanged water, and air-dried. Subsequently, the film was post-baked in a clean oven at 230° C. for 30 minutes to form a red pixel, which was a striped colored layer, on the transparent substrate.

Next, the green colored composition was applied by spin coating in the same manner so as to form a film having a thickness of 2 μm. After drying, exposure and development were performed with an exposure device so that a striped colored layer was formed in a place shifted from the place of the red pixel. Thus, a green pixel adjacent to the red pixel was formed.

Next, the blue colored composition was applied by spin coating in the same manner so as to form a blue pixel having a film thickness of 2 μm and disposed adjacent to the red pixel and green pixel. Thus, a three-color filter including red, green, and blue striped pixels was produced on the transparent substrate.

When necessary, the yellow colored composition was applied by spin coating in the same manner so as to form a blue pixel having a film thickness of 2 μm and disposed adjacent to the red pixel and green pixel. Thus, a four-color filter including red, green, blue, and yellow striped pixels was produced on the transparent substrate.

Color filters 1 to 4 and a comparative color filter 1 were produced using dye-colored compositions or pigment-colored compositions listed in Table 9.

TABLE 9

|  | Color filter 1 | Color filter 2 | Color filter 3 | Color filter 4 | Comparative color filter 1 |
|---|---|---|---|---|---|
| R pixel portion | Red pigment-colored | Red pigment-colored | Red pigment-colored | Red pigment-colored | Red dye-colored |

TABLE 9-continued

|  | Color filter 1 | Color filter 2 | Color filter 3 | Color filter 4 | Comparative color filter 1 |
|---|---|---|---|---|---|
|  | composition 1 | composition 2 | composition 3 | composition 4 | composition 1 |
| G pixel portion | Green dye-colored composition 1 | Green dye-colored composition 2 | Green pigment-colored composition 1 | Green pigment-colored composition 2 | Green dye-colored composition 3 |
| B pixel portion | Blue dye-colored composition 1 | Blue pigment-colored composition 1 | Blue pigment-colored composition 2 | Blue pigment-colored composition 3 | Blue dye-colored composition 2 |
| Y pixel portion | None | Yellow dye-colored composition 1 | None | Yellow pigment-colored composition 1 | Yellow dye-colored composition 2 |

In each of the pixel portions of the color filter, the x value and y value in the CIE 1931 XYZ color system with use of a C light source were measured with a microspectrophotometer including a microscope MX-50 manufactured by Olympus Corporation and a spectrophotometer MCPD-3000 manufactured by Otsuka Electronics Co., Ltd. The following Table 10 shows the results.

TABLE 10

|  | Color filter 1 (x, y) | Color filter 2 (x, y) | Color filter 3 (x, y) | Color filter 4 (x, y) | Comparative color filter (x, y) |
|---|---|---|---|---|---|
| R pixel portion | (0.63, 0.32) | (0.64, 0.35) | (0.68, 0.32) | (0.61, 0.36) | (0.59, 0.30) |
| G pixel portion | (0.26, 0.68) | (0.27, 0.69) | (0.24, 0.67) | (0.24, 0.72) | (0.20, 0.55) |
| B pixel portion | (0.17, 0.10) | (0.13, 0.14) | (0.14, 0.10) | (0.19, 0.10) | (0.14, 0.15) |
| Y pixel portion |  | (0.47, 0.51) |  | (0.48, 0.50) | (0.49, 0.48) |

Examples 1 to 4

An electrode structure was formed on at least one of first and second substrates, and an alignment film having a horizontal alignment property was formed on each of surfaces of the first and second substrates facing each other. Then, a weak rubbing treatment was performed, an IPS cell was made, and a liquid crystal composition 1 described below was sandwiched between the first substrate and the second substrate. Table 11 shows the physical properties of the liquid crystal composition 1. Subsequently, liquid crystal display devices of Examples 1 to 4 were produced using the color filters 1 to 4 listed in Table 9 ($d_{gap}$=4.0 μm, alignment film AL-1051). The VHR and ID of the produced liquid crystal display devices were measured. The image sticking of the produced liquid crystal display devices was also evaluated. Table 12 shows the results.

[Chem. 24]

| Chemical structure | Proportion | Abbreviation |
|---|---|---|
| 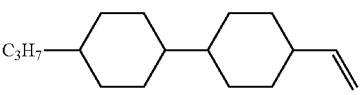 | 48% | 3-Cy—Cy-1d0 |
| 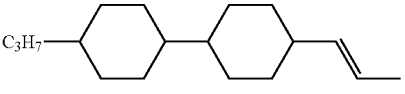 | 4% | 3-Cy—Cy-1d1 |
| 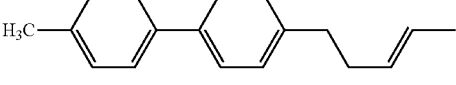 | 8% | 1-Ph—Ph-3d1 |
| 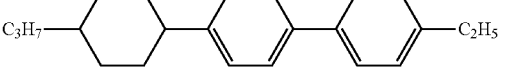 | 5% | 3-Cy—Ph—Ph-2 |
| 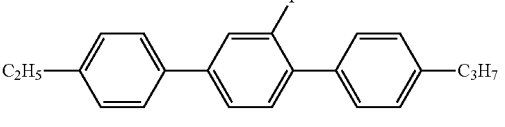 | 5% | 2-Ph—Ph1—Ph-3 |
| 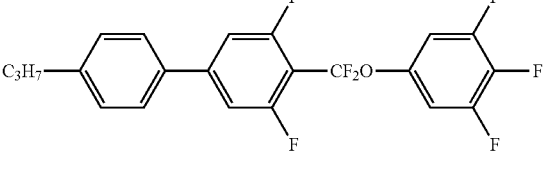 | 2% | 3-Ph—Ph3—CFFO—Ph3—F |
| 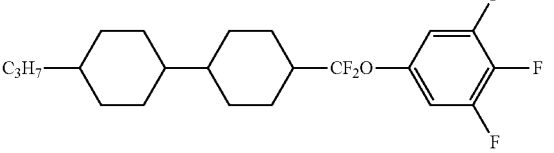 | 3% | 3-Cy—Cy—CFFO—Ph3—F |
| 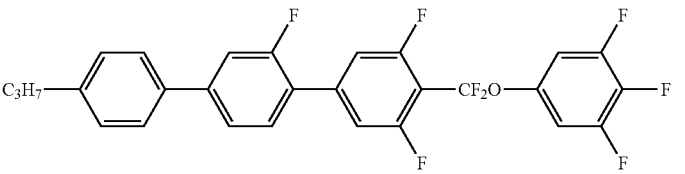 | 7% | 3-Ph—Ph1—Ph3—CFFO—Ph3—F |
| 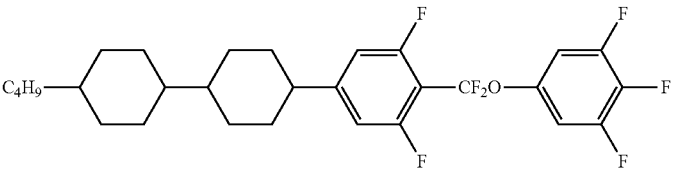 | 5% | 4-Cy—Cy—Ph3—CFFO—Ph3—F |

TABLE 11

| | |
|---|---|
| $T_{NI}/°C$ | 75.8 |
| $\Delta n$ | 0.112 |
| $n_o$ | 1.488 |
| $\epsilon_\perp$ | 5.5 |
| $\Delta\epsilon$ | 2.9 |
| $\eta$/mPa·s | 13.5 |

TABLE 12

| | Example 1 | Example 2 | Example 3 | Example 4 |
|---|---|---|---|---|
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 99.1 | 99.3 | 99.5 | 99.6 |

TABLE 12-continued

|    | Example 1 | Example 2 | Example 3 | Example 4 |
|----|-----------|-----------|-----------|-----------|
| ID | 77 | 55 | 28 | 19 |
| Image sticking | B | A | A | A |

It was found that the liquid crystal composition 1 had a liquid crystal phase temperature range of 75.8° C., which was practical for use as a liquid crystal composition for TVs, a high absolute value of dielectric anisotropy, low viscosity, and an optimal value of Δn.

In the liquid crystal display devices of Examples 1 to 4, high VHRs and low IDs were achieved. In the evaluation of image sticking, no residual image was observed or a residual image was slightly observed, which was at an acceptable level.

Examples 5 to 12

Liquid crystal compositions 2 and 3 listed in Table 13 were sandwiched as in Example 1. Liquid crystal display devices of Examples 5 to 12 were produced using the color filters listed in Table 9 and the VHR and ID were measured. The image sticking of the liquid crystal display devices was also evaluated. Tables 14 and 15 show the results.

TABLE 13

| Name of compound | Content (%) |
|---|---|
| Liquid crystal composition 2 | |
| 4-Cy-Cy-1d0 | 15 |
| 0d1-Cy-Cy-Ph-1 | 4 |
| 0d3-Cy-Cy-Ph-1 | 14 |
| 3-Cy-Ph—Ph-Cy-3 | 3 |
| 3-Cy-Ph—Ph1-Cy-3 | 4 |
| 1-Cy-Cy-Ph3—F | 9 |
| 2-Cy-Ph—Ph3—F | 10 |
| 3-Cy-Ph—Ph3—F | 10 |
| 5-Cy-Ph—Ph3—F | 5 |
| 0d1-Cy-Cy-Ph1—F | 8 |
| 3-Cy-Cy-Ph1—Ph3—F | 8 |
| 2-Ph—Ph3—CFFO—Ph3—F | 4 |
| 3-Ph—Ph3—CFFO—Ph3—F | 6 |
| $T_{ni}$/° C. | 100.7 |
| Δn | 0.094 |
| Δε | 8.0 |
| γ1/mPa·s | 108 |
| η/mPa·s | 22.2 |
| Liquid crystal composition 3 | |
| 5-Cy-Cy-1d0 | 5 |
| 3-Cy-Cy-1d1 | 10 |
| 0d1-Cy-Cy-Ph-1 | 8 |
| 5-Cy-Cy-Ph—O1 | 6 |
| 2-Ph—Ph1—Ph-3 | 8 |
| 2-Cy-Cy-Ph3—F | 11 |
| 3-Cy-Cy-Ph3—F | 15 |
| 5-Cy-Cy-Ph3—F | 5 |
| 3-Cy-Ph—Ph3—F | 6 |
| 3-Cy-Ph—Ph1—F | 9 |
| 4-Cy-Cy-Ph—OCFFF | 4 |
| 3-Cy-Cy-CFFO—Ph3—F | 7 |
| 5-Cy-Cy-CFFO—Ph3—F | 4 |
| 3-Cy-Cy-Ph1—Ph3—F | 2 |
| $T_{ni}$/° C. | 103.2 |
| Δn | 0.102 |
| Δε | 7.1 |
| γ1/mPa·s | 96 |
| η/mPa·s | 20.8 |

TABLE 14

|  | Example 5 | Example 6 | Example 7 | Example 8 |
|---|---|---|---|---|
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.2 | 99.4 | 99.6 | 99.6 |
| ID | 73 | 51 | 25 | 22 |
| Image sticking | B | A | A | A |

TABLE 15

|  | Example 9 | Example 10 | Example 11 | Example 12 |
|---|---|---|---|---|
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.4 | 99.4 | 99.6 | 99.7 |
| ID | 57 | 53 | 21 | 14 |
| Image sticking | A | A | A | A |

In the liquid crystal display devices of Examples 5 to 12, high VHRs and low IDs were achieved. In the evaluation of image sticking, no residual image was observed or a residual image was slightly observed, which was at an acceptable level.

Examples 13 to 24

Liquid crystal compositions 4 to 6 listed in Table 16 were sandwiched as in Example 1. Liquid crystal display devices of Examples 13 to 24 were produced using the color filters listed in Table 9 and the VHR and ID were measured. The image sticking of the liquid crystal display devices was also evaluated. Tables 17 to 19 show the results.

TABLE 16

| Name of compound | Content (%) |
|---|---|
| Liquid crystal composition 4 | |
| 5-Cy-Cy-1d0 | 15 |
| 3-Cy-Cy-1d1 | 2 |
| 0d1-Cy-Cy-Ph-1 | 12 |
| 2-Ph—Ph1—Ph-3 | 3 |
| 2-Ph—Ph1—Ph4 | 3 |
| 2-Cy-Cy-Ph3—F | 8 |
| 2-Cy-Ph—Ph3—F | 3 |
| 3-Cy-Ph—Ph3—F | 9 |
| 4-Cy-Cy-Ph—OCFFF | 14 |
| 3-Ph—Ph3—CFFO—Ph3—F | 11 |
| 2-Cy-Cy-CFFO—Ph3—F | 9 |
| 3-Cy-Cy-CFFO—Ph3—F | 8 |
| 3-Cy-Cy-Ph1—Ph3—F | 3 |
| $T_{ni}$/° C. | 90.2 |
| Δn | 0.098 |
| Δε | 9.1 |
| γ1/mPa·s | 90 |
| η/mPa·s | 18.1 |

TABLE 16-continued

| Name of compound | Content (%) |
|---|---|
| Liquid crystal composition 5 | |
| 5-Cy-Cy-1d0 | 10 |
| 3-Cy-Cy-1d1 | 5 |
| 0d1-Cy-Cy-Ph-1 | 8 |
| 0d3-Cy-Cy-Ph-1 | 12 |
| 2-Ph—Ph1—Ph-5 | 2 |
| 3-Cy-Ph—Ph-Cy-3 | 3 |
| 3-Cy-Ph—Ph1-Cy-3 | 3 |
| 1-Cy-Cy-Ph3—F | 9 |
| 2-Cy-Cy-Ph3—F | 10 |
| 3-Cy-Cy-Ph3—F | 6 |
| 5-Cy-Cy-Ph3—F | 5 |
| 0d1-Cy-Cy-Ph1—F | 8 |
| 2-Ph—Ph3—CFFO—Ph3—F | 4 |
| 3-Ph—Ph3—CFFO—Ph3—F | 6 |
| 3-Cy-Cy-Ph1—Ph3—F | 9 |
| $T_{ni}$/° C. | 110.0 |
| Δn | 0.099 |
| Δε | 8.3 |
| γ1/mPa·s | 112 |
| η/mPa·s | 23.4 |
| Liquid crystal composition 6 | |
| 5-Cy-Cy-1d0 | 12 |
| 3-Cy-Cy-1d1 | 25 |
| 3-Cy-Cy-1d1 | 12 |
| 0d1-Cy-Cy-Ph-1 | 4 |
| 0d3-Cy-Cy-Ph-1 | 9 |
| 2-Ph—Ph1—Ph3—F | 5 |
| 3-Ph—Ph1—Ph3—F | 9 |
| 2-Ph—Ph3—CFFO—Ph3—F | 4 |
| 3-Ph—Ph3—CFFO—Ph3—F | 6 |
| 3-Cy-Cy-CFFO—Ph3—F | 2 |
| 5-Cy-Cy-CFFO—Ph3—F | 3 |
| 3-Cy-Cy-Ph1—Ph3—F | 9 |
| $T_{ni}$/° C. | 77.4 |
| Δn | 0.101 |
| Δε | 7.0 |
| γ1/mPa·s | 86 |
| η/mPa·s | 14.2 |

TABLE 17

| | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.1 | 99.3 | 99.5 | 99.6 |
| ID | 78 | 60 | 30 | 20 |
| Image sticking | B | A | A | A |

TABLE 18

| | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.3 | 99.4 | 99.7 | 99.6 |
| ID | 64 | 58 | 18 | 23 |
| Image sticking | A | A | A | A |

TABLE 19

| | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.2 | 99.3 | 99.6 | 99.6 |
| ID | 69 | 62 | 24 | 18 |
| Image sticking | B | A | A | A |

In the liquid crystal display devices of Examples 13 to 24, high VHRs and low IDs were achieved. In the evaluation of image sticking, no residual image was observed or a residual image was slightly observed, which was at an acceptable level.

Examples 25 to 36

An electrode structure was formed on first and second substrates, and an alignment film having a horizontal alignment property was formed on each of surfaces of the first and second substrates facing each other. Then, a weak rubbing treatment was performed, a TN cell was made, and liquid crystal compositions 7 to 9 described in Table 20 were sandwiched between the first substrate and the second substrate. Subsequently, liquid crystal display devices of Examples 25 to 36 were produced using the color filters 1 to 4 listed in Table 9 ($d_{gap}$=3.5 μm, alignment film SE-7492). The VHR and ID of the produced liquid crystal display devices were measured. The image sticking of the produced liquid crystal display devices was also evaluated. Tables 21 to 23 show the results.

TABLE 20

| Name of compound | Content (%) |
|---|---|
| Liquid crystal composition 7 | |
| 3-Cy-Cy-1d0 | 38 |
| 3-Cy-Cy-1d1 | 9 |
| 0d1-Cy-Cy-Ph-1 | 16 |
| 0d3-Cy-Cy-Ph-1 | 4 |
| 2-Ph—Ph3—CFFO—Ph3—F | 2 |
| 3-Ph—Ph3—CFFO—Ph3—F | 12 |
| 3-Cy-Cy-CFFO—Ph3—F | 7 |
| 3-Ph—Ph—Ph1—Ph3—F | 1 |
| 3-Ph—Ph1—Ph3—CFFO—Ph3—F | 2 |
| 2-Py—Ph—Ph3—CFFO—Ph3—F | 9 |
| $T_{ni}$/° C. | 76.0 |
| Δn | 0.097 |
| Δε | 6.8 |
| γ1/mPa·s | 83 |
| η/mPa·s | 14.5 |
| Liquid crystal composition 8 | |
| 3-Cy-Cy-1d0 | 38 |
| 3-Cy-Cy-1d1 | 14 |
| 0d3-Cy-Cy-Ph-1 | 8 |
| 3-Ph—Ph3—CFFO—Ph3—F | 9 |
| 3-Cy-Cy-CFFO—Ph3—F | 15 |
| 3-Ph—Ph1—Ph3—CFFO—Ph3—F | 2 |
| 4-Ph—Ph1—Ph3—CFFO—Ph3—F | 7 |
| 5-Ph—Ph1—Ph3—CFFO—Ph3—F | 7 |
| $T_{ni}$/° C. | 81.8 |
| Δn | 0.099 |
| Δε | 8.0 |
| γ1/mPa·s | 83 |
| η/mPa·s | 14.6 |

TABLE 20-continued

| Name of compound | Content (%) |
|---|---|
| Liquid crystal composition 9 | |
| 3-Cy-Cy-1d0 | 30 |
| 3-Cy-Cy-1d1 | 17 |
| 0d1-Cy-Cy-Ph-1 | 7 |
| 0d3-Cy-Cy-Ph-1 | 7 |
| 3-Cy-Cy-Ph-2 | 2 |
| 2-Ph—Ph1—Ph-4 | 2 |
| 2-Ph—Ph1—Ph3—F | 8 |
| 3-Ph—Ph1—Ph3—F | 12 |
| 3-Ph—Ph3—Ph3—F | 4 |
| 3-Cy-Cy-Ph1—CFFO—Ph3—F | 11 |
| $T_{ni}/°C.$ | 75.0 |
| $\Delta n$ | 0.112 |
| $\Delta \epsilon$ | 8.7 |
| $\gamma 1/mPa \cdot s$ | 87 |
| $\eta/mPa \cdot s$ | 15.2 |

TABLE 21

| | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.4 | 99.4 | 99.6 | 99.7 |
| ID | 62 | 56 | 18 | 15 |
| Image sticking | A | A | A | A |

TABLE 22

| | Example 29 | Example 30 | Example 31 | Example 32 |
|---|---|---|---|---|
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 99.3 | 99.3 | 99.5 | 99.6 |
| ID | 70 | 65 | 29 | 19 |
| Image sticking | B | A | A | A |

TABLE 23

| | Example 33 | Example 34 | Example 35 | Example 36 |
|---|---|---|---|---|
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.1 | 99.2 | 99.5 | 99.7 |
| ID | 79 | 70 | 33 | 17 |
| Image sticking | B | B | A | A |

In the liquid crystal display devices of Examples 25 to 36, high VHRs and low IDs were achieved. In the evaluation of image sticking, no residual image was observed or a residual image was slightly observed, which was at an acceptable level.

Examples 37 to 44

An electrode structure was formed on at least one of first and second substrates, and an alignment film having a horizontal alignment property was formed on each of surfaces of the first and second substrates facing each other. Then, a weak rubbing treatment was performed, an FFS cell was made, and liquid crystal compositions 10 and 11 described in Table 24 were sandwiched between the first substrate and the second substrate. Subsequently, liquid crystal display devices of Examples 37 to 44 were produced using the color filters 1 to 4 listed in Table 9 ($d_{gap}$=4.0 μm, alignment film AL-1051). The VHR and ID of the produced liquid crystal display devices were measured. The image sticking of the produced liquid crystal display devices was also evaluated. Tables 25 and 26 show the results.

TABLE 24

| Name of compound | Content (%) |
|---|---|
| Liquid crystal composition 10 | |
| 3-Cy-Cy-1d0 | 39 |
| 3-Cy-Cy-1d1 | 7 |
| 0d1-Cy-Cy-Ph-1 | 11 |
| 2-Ph—Ph1—Ph-3 | 8 |
| 2-Ph—Ph1—Ph-5 | 8 |
| 3-Ph—Ph3—CFFO—Ph3-F | 10 |
| 3-Cy-Cy-Ph—Ph3-F | 6 |
| 4-Ph—Ph1—Ph3—CFFO—Ph3—F | 11 |
| $T_{ni}/°C.$ | 76.0 |
| $\Delta n$ | 0.114 |
| $\Delta \epsilon$ | 6.0 |
| $\gamma 1/mPa \cdot s$ | 77 |
| $\eta/mPa \cdot s$ | 13.3 |
| Liquid crystal composition 11 | |
| 3-Cy-Cy-1d0 | 44 |
| 3-Cy-Cy-1d1 | 3 |
| 2-Ph—Ph-3d1 | 13 |
| 3-Cy-Ph—Ph-2 | 7 |
| 2-Ph—Ph1—Ph-3 | 8 |
| 3-Ph—Ph1—Ph-3 | 7 |
| 3-Ph—Ph1—Ph3—CFFO—Ph3—F | 9 |
| 4-Cy-Cy-Ph1—CFFO—Ph3—F | 3 |
| 3-Cy-Ph3—Ph1—OCFFF | 6 |
| $T_{ni}/°C.$ | 77.9 |
| $\Delta n$ | 0.131 |
| $\Delta \epsilon$ | 4.6 |
| $\gamma 1/mPa \cdot s$ | 74 |
| $\eta/mPa \cdot s$ | 12.4 |

TABLE 25

| | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 99.3 | 99.3 | 99.7 | 99.6 |
| ID | 60 | 59 | 20 | 22 |
| Image sticking | A | A | A | A |

TABLE 26

|  | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.3 | 99.4 | 99.5 | 99.6 |
| ID | 61 | 54 | 35 | 25 |
| Image sticking | B | A | A | A |

In the liquid crystal display devices of Examples 37 to 44, high VHRs and low IDs were achieved. In the evaluation of image sticking, no residual image was observed or a residual image was slightly observed, which was at an acceptable level.

Examples 45 to 56

Liquid crystal compositions 12 to 14 listed in Table 27 were sandwiched as in Example 37. Liquid crystal display devices of Examples 45 to 56 were produced using the color filters listed in Table 9 and the VHR and ID were measured. The image sticking of the liquid crystal display devices was also evaluated. Tables 28 to 30 show the results.

TABLE 27

| Name of compound | Content (%) |
|---|---|
| Liquid crystal composition 12 | |
| 3-Cy-Cy-1d0 | 47 |
| 3-Cy-Cy-1d1 | 9 |
| 3-Cy-Cy-Ph-2 | 7 |
| 2-Ph—Ph1—Ph-3 | 4 |
| 2-Ph—Ph1—Ph-5 | 7 |
| 3-Cy-Ph—Ph-Cy-3 | 2 |
| 2-Ph—Ph1—Ph-3 | 6 |
| 3-Ph—Ph1—Ph-3 | 7 |
| 3-Ph—Ph3—CFFO—Ph3—F | 2 |
| 3-Cy-Cy-Ph1—Ph3—F | 2 |
| 3-Cy-Ph—Ph3—Ph1—OCFFF | 7 |
| $T_{ni}/°C.$ | 80.6 |
| $\Delta n$ | 0.122 |
| $\Delta \epsilon$ | 6.0 |
| $\gamma 1/mPa \cdot s$ | 65 |
| $\eta/mPa \cdot s$ | 11.1 |
| Liquid crystal composition 13 | |
| 3-Cy-Cy-1d0 | 29 |
| 5-Cy-Cy-1d1 | 8 |
| 3-Cy-Cy-1d1 | 13 |
| 5-Ph—Ph-1 | 2 |
| 2-Ph—Ph1—Ph-3 | 6 |
| 2-Ph—Ph1—Ph-4 | 6 |
| 2-Ph—Ph1—Ph-5 | 6 |
| 3-Cy-Ph—Ph-Cy-3 | 4 |
| 3-Ph—Ph1—Ph3—F | 9 |
| 2-Ph—Ph3—Ph3—F | 7 |
| 3-Ph—Ph3—CFFO—Ph3—F | 4 |
| 3-Cy-Ph—Cl | 3 |
| 3-Cy-Cy-Ph1—Ph3—F | 3 |
| $T_{ni}/°C.$ | 74.9 |
| $\Delta n$ | 0.121 |
| $\Delta \epsilon$ | 4.1 |
| $\gamma 1/mPa \cdot s$ | 60 |
| $\eta/mPa \cdot s$ | 10.8 |
| Liquid crystal composition 14 | |
| 3-Cy-Cy-1d0 | 10 |
| 3-Cy-Cy-1d1 | 6 |
| 3-Cy-Cy-1d1-F | 28 |

TABLE 27-continued

| Name of compound | Content (%) |
|---|---|
| 0d1-Cy-Cy-Ph-1 | 11 |
| 0d3-Cy-Cy-Ph-1 | 10 |
| 2-Ph—Ph1—Ph—3 | 10 |
| 2-Ph—Ph1—Ph—5 | 10 |
| 5-Cy-Ph—Ph1—Ph-2 | 2 |
| 3-Ph—Ph3—CFFO—Ph3-F | 7 |
| 3-Cy-Cy-Ph1—CFFO—Ph3—F | 6 |
| $T_{ni}/°C.$ | 80.0 |
| $\Delta n$ | 0.110 |
| $\Delta \epsilon$ | 5.9 |
| $\gamma 1/mPa \cdot s$ | 68 |
| $\eta/mPa \cdot s$ | 11.6 |

TABLE 28

|  | Example 45 | Example 46 | Example 47 | Example 48 |
|---|---|---|---|---|
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.3 | 99.5 | 99.7 | 99.8 |
| ID | 63 | 34 | 19 | 13 |
| Image sticking | A | A | A | A |

TABLE 29

|  | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.2 | 99.3 | 99.5 | 99.5 |
| ID | 72 | 67 | 36 | 26 |
| Image sticking | B | A | A | A |

TABLE 30

|  | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 99.2 | 99.4 | 99.6 | 99.7 |
| ID | 67 | 55 | 21 | 16 |
| Image sticking | B | A | A | A |

In the liquid crystal display devices of Examples 45 to 56, high VHRs and low IDs were achieved. In the evaluation of image sticking, no residual image was observed or a residual image was slightly observed, which was at an acceptable level.

Examples 57 to 60

A liquid crystal composition 15 was prepared by mixing 0.3% by mass of bismethacrylic acid biphenyl-4,4'-diyl with the liquid crystal composition 10 used in Example 37. The liquid crystal composition 15 was sandwiched in the TN cell. A polymerization treatment was performed by performing irradiation with ultraviolet rays (3.0 J/cm$^2$) for 600 seconds while applying a driving voltage between electrodes. Liquid crystal display devices of Examples 57 to 60 were then produced using the color filters 1 to 4 listed in Table 9 and the VHR and ID were measured. The image sticking of the liquid crystal display devices was also evaluated.
Table 31 shows the results.

TABLE 31

|  | Example 57 | Example 58 | Example 59 | Example 60 |
|---|---|---|---|---|
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.3 | 99.5 | 99.7 | 99.7 |
| ID | 69 | 41 | 15 | 17 |
| Image sticking | B | A | A | A |

In the liquid crystal display devices of Examples 57 to 60, high VHRs and low IDs were achieved. In the evaluation of image sticking, no residual image was observed or a residual image was slightly observed, which was at an acceptable level.

Examples 61 to 64

A liquid crystal composition 16 was prepared by mixing 0.3% by mass of bismethacrylic acid biphenyl-4,4'-diyl with the liquid crystal composition 8 used in Example 29. The liquid crystal composition 16 was sandwiched in the IPS cell. A polymerization treatment was performed by performing irradiation with ultraviolet rays (3.0 J/cm$^2$) for 600 seconds while applying a driving voltage between electrodes. Liquid crystal display devices of Examples 61 to 64 were then produced using the color filters 1 to 4 listed in Table 9 and the VHR and ID were measured. The image sticking of the liquid crystal display devices was also evaluated.
Table 32 shows the results.

TABLE 32

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.2 | 99.3 | 99.5 | 99.7 |
| ID | 74 | 61 | 39 | 20 |
| Image sticking | B | A | A | A |

In the liquid crystal display devices of Examples 61 to 64, high VHRs and low IDs were achieved. In the evaluation of image sticking, no residual image was observed or a residual image was slightly observed, which was at an acceptable level.

Examples 65 to 68

A liquid crystal composition 17 was prepared by mixing 0.3% by mass of bismethacrylic acid 3-fluorobiphenyl-4,4'-diyl with the liquid crystal composition 6 used in Example 21. The liquid crystal composition 17 was sandwiched in the FFS cell. A polymerization treatment was performed by performing irradiation with ultraviolet rays (3.0 J/cm$^2$) for 600 seconds while applying a driving voltage between electrodes. Liquid crystal display devices of Examples 65 to 68 were then produced using the color filters 1 to 4 listed in Table 9 and the VHR and ID were measured. The image sticking of the liquid crystal display devices was also evaluated. Table 33 shows the results.

TABLE 33

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.1 | 99.2 | 99.6 | 99.6 |
| ID | 83 | 68 | 23 | 21 |
| Image sticking | B | B | A | A |

In the liquid crystal display devices of Examples 65 to 68, high VHRs and low IDs were achieved. In the evaluation of image sticking, no residual image was observed or a residual image was slightly observed, which was at an acceptable level.

Comparative Examples 1 to 4

A comparative liquid crystal composition 1 described below was sandwiched in the IPS cell used in Example 1. Table 34 shows the physical properties of the comparative liquid crystal composition. Liquid crystal display devices of Comparative Examples 1 to 4 were produced using the color filters 1 to 4 listed in Table 9 and the VHR and ID were measured. The image sticking of the liquid crystal display devices was also evaluated. Table 35 shows the results.

[Chem.25]

| Chemical structure | Proportion | Abbreviation |
|---|---|---|
| 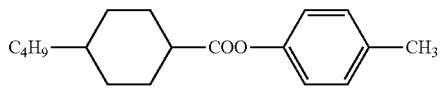 | 27% | 4-Cy—VO—Ph-1 |

[Chem.25]

| Chemical structure | Proportion | Abbreviation |
|---|---|---|
| C₅H₁₁–[Cy]–COO–[Ph]–CH₃ | 20% | 5-Cy—VO—Ph-1 |
| C₅H₁₁–[Cy]–COO–[Ph]–C₃H₇ | 20% | 5-Cy—VO—Ph-3 |
| C₃H₇–[Ph]–[Ph(F,F)]–CF₂O–[Ph(F,F,F)] | 8% | 3-Ph—Ph3—CFFO—Ph3—F |
| C₃H₇–[Cy]–[Cy]–CF₂O–[Ph(F,F,F)] | 13% | 3-Cy—Cy—CFFO—Ph3—F |
| C₃H₇–[Ph]–[Ph(F)]–[Ph(F,F)]–CF₂O–[Ph(F,F,F)] | 12% | 3-Ph—Ph1—Ph3—CFFO—Ph3—F |

TABLE 34

| | |
|---|---|
| T$_{NI}$/° C. | 69.3 |
| Δn | 0.096 |
| no | 1.484 |
| ε$_\perp$ | 5.5 |
| Δε | 4.8 |
| η/mPa·s | 30.3 |

TABLE 35

| | Liquid crystal composition | | | |
|---|---|---|---|---|
| | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 97.8 | 98.0 | 98.2 | 98.4 |
| ID | 193 | 179 | 164 | 140 |
| Image sticking | D | D | D | D |

In the liquid crystal display devices of Comparative Examples 1 to 4, the VHRs were decreased and the IDs were increased compared with the liquid crystal display devices of the invention of this application. In the evaluation of image sticking, a residual image was observed, which was at an unacceptable level.

Comparative Examples 5 to 12

Comparative liquid crystal compositions 2 and 3 listed in Table 36 were sandwiched as in Example 1. Liquid crystal display devices of Comparative Examples 5 to 12 were produced using the color filters 1 to 4 listed in Table 9 and the VHR and ID were measured. The image sticking of the liquid crystal display devices was also evaluated. Tables 37 and 38 show the results.

TABLE 36

| Name of compound | Content (%) |
|---|---|
| Comparative liquid crystal composition 2 | |
| 2-Cy-Cy-Ph3—F | 12 |
| 3-Cy-Cy-Ph3—F | 10 |
| 5-Cy-Cy-Ph3—F | 6 |
| 2-Cy-Cy-Ph—OCFFF | 9 |
| 3-Cy-Cy-Ph—OCFFF | 8 |
| 4-Cy-Cy-Ph—OCFFF | 7 |
| 2-Cy-Ph1-Ph3—F | 12 |
| 3-Cy-Ph1-Ph3—F | 10 |
| 2-Cy—Py—Cy—CFFO—Ph3—F | 5.5 |
| 2-Ph—Ph1—Ph3—F | 5.5 |
| Od1-Cy-Cy-CFFO—Ph3—F | 15 |
| T$_{ni}$/° C. | 75.7 |
| Δn | 0.093 |
| γ1/mPa·s | 146 |
| Comparative liquid crystal composition 3 | |
| 2-Cy-Cy-Ph3—F | 12 |
| 3-Cy-Cy-Ph3—F | 10 |

TABLE 36-continued

| Name of compound | Content (%) |
|---|---|
| 2-Cy-Cy-Ph—OCFFF | 8 |
| 3-Cy-Cy-Ph—OCFFF | 8 |
| 4-Cy-Cy-Ph—OCFFF | 7 |
| 5-Cy-Cy-Ph—OCFFF | 4 |
| 2-Cy-Ph1—Ph3—F | 12 |
| 3-Cy-Ph1—Ph3—F | 4 |
| 2-Cy-Cy—CFFO—Ph3—F | 12 |
| 2-Ph—Ph1—Ph3—F | 8 |
| 0d1-Cy-Cy-CFFO—Ph3—F | 15 |
| $T_{ni}/°C.$ | 75.0 |
| $\Delta n$ | 0.093 |
| $\gamma 1/mPa \cdot s$ | 139 |

TABLE 37

| | Comparative Example 5 | Comparative Example 6 | Comparative Example 7 | Comparative Example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.0 | 98.2 | 98.4 | 98.4 |
| ID | 175 | 160 | 143 | 136 |
| Image sticking | D | D | D | D |

TABLE 38

| | Comparative Example 9 | Comparative Example 10 | Comparative Example 11 | Comparative Example 12 |
|---|---|---|---|---|
| Liquid crystal composition | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 |
| VHR | 98.0 | 98.1 | 98.4 | 98.4 |
| ID | 181 | 168 | 139 | 133 |
| Image sticking | D | D | D | C |

In the liquid crystal display devices of Comparative Examples 5 to 12, the VHRs were decreased and the IDs were increased compared with the liquid crystal display devices of the invention of this application. In the evaluation of image sticking, a residual image was observed, which was at an unacceptable level.

Comparative Examples 13 to 20

Comparative liquid crystal compositions 4 and 5 listed in Table 39 were sandwiched as in Example 1. Liquid crystal display devices of Comparative Examples 13 to 24 were produced using the color filters 1 to 4 listed in Table 9 and the VHR and ID were measured. The image sticking of the liquid crystal display devices was also evaluated. Tables 40 and 41 show the results.

TABLE 39

| Name of compound | Content (%) |
|---|---|
| Comparative liquid crystal composition 4 | |
| 4-Cy-Cy-1d0 | 15 |
| 0d1-Cy-Cy-Ph-1 | 4 |
| 0d3-Cy-Cy-Ph-1 | 14 |
| 3-Cy-Ph—Ph-Cy-3 | 3 |
| 3-Cy-Ph—Ph1-Cy-3 | 4 |
| 1-Cy-Cy-Ph3—F | 9 |
| 2-Cy-Cy-Ph3—F | 10 |
| 3-Cy-Cy-Ph3—F | 10 |
| 5-Cy-Cy-Ph3—F | 5 |
| 3-Cy-Ph1—Ph3—F | 8 |
| 5-Cy-Ph1—Ph3—F | 7 |
| 3-Ph—Ph1—Ph3—F | 3 |
| 3-Cy-Cy-Ph1—Ph3—F | 8 |
| $T_{ni}/°C.$ | 101.0 |
| $\Delta n$ | 0.095 |
| $\Delta \epsilon$ | 8.2 |
| $\gamma 1/mPa \cdot s$ | 115 |
| $\eta/mPa \cdot s$ | 23.6 |
| Comparative liquid crystal composition 5 | |
| 2-Cy-Cy-1d0 | 32 |
| 0d1-Cy-Cy-Ph-1 | 4 |
| 2-Ph—Ph1—Ph-3 | 10 |
| 2-Ph—Ph1—Ph-5 | 11 |
| 3-Ph—Ph1—Ph-5 | 7 |
| 2-Cy-Cy-Ph—F | 6 |
| 3-Cy-Cy-Ph—F | 21 |
| 5-Cy-Ph—Ph—F | 7 |
| 3-Cy-Ph—Ph3—F | 2 |
| $T_{ni}/°C.$ | 77.2 |
| $\Delta n$ | 0.135 |
| $\Delta \epsilon$ | 4.5 |
| $\gamma 1/mPa \cdot s$ | 57 |
| $\eta/mPa \cdot s$ | 10.5 |

TABLE 40

| | Comparative Example 13 | Comparative Example 14 | Comparative Example 15 | Comparative Example 16 |
|---|---|---|---|---|
| Liquid crystal composition | Comparative liquid crystal composition 4 | Comparative liquid crystal composition 4 | Comparative liquid crystal composition 4 | Comparative liquid crystal composition 4 |
| Color filter | Color filter 1 | Color filter 2 | Color filter 3 | Color filter 4 |
| VHR | 97.8 | 98.1 | 98.2 | 98.3 |
| ID | 203 | 170 | 159 | 148 |
| Image sticking | D | D | D | D |

TABLE 41

| | Comparative Example 17 | Comparative Example 18 | Comparative Example 19 | Comparative Example 20 |
|---|---|---|---|---|
| Liquid crystal composition | Comparative liquid crystal composition 5 | Comparative liquid crystal composition 5 | Comparative liquid crystal composition 5 | Comparative liquid crystal composition 5 |
| Color filter | Color filter 1 | Color filter 2 | Color filter 3 | Color filter 4 |
| VHR | 98.0 | 98.2 | 98.3 | 98.5 |
| ID | 182 | 166 | 144 | 138 |
| Image sticking | D | D | D | C |

In the liquid crystal display devices of Comparative Examples 13 to 20, the VHRs were decreased and the IDs were increased compared with the liquid crystal display devices of the invention of this application. In the evaluation of image sticking, a residual image was observed, which was at an unacceptable level.

Comparative Examples 21 to 32

Comparative liquid crystal compositions 6 to 8 listed in Table 42 were sandwiched as in Example 1. Liquid crystal display devices of Comparative Examples 21 to 32 were produced using the color filters 1 to 4 listed in Table 9 and the VHR and ID were measured. The image sticking of the liquid crystal display devices was also evaluated. Tables 43 to 45 show the results.

TABLE 42

| Name of compound | Content (%) |
|---|---|
| Comparative liquid crystal composition 6 | |
| 4-Cy-Cy-1d0 | 18 |
| 3-Cy-Cy-4 | 15 |
| 0d1-Cy-Cy-Ph-1 | 8 |
| 2-Ph—Ph1—Ph-3 | 10 |
| 2-Ph—Ph1—Ph-5 | 6 |
| 3-Ph—Ph1—Ph-5 | 6 |
| 2-Cy-Cy-Ph—F | 6 |
| 3-Cy-Cy-Ph—F | 10 |
| 5-Cy-Ph—Ph—F | 7 |
| 3-Cy-Ph—Ph3—F | 14 |
| $T_{ni}/°C$ | 73.5 |
| $\Delta n$ | 0.126 |
| $\Delta \epsilon$ | 4.9 |
| $\gamma 1/mPa \cdot s$ | 94 |
| $\eta/mPa \cdot s$ | 16.9 |
| Comparative liquid crystal composition 7 | |
| 4-Cy-Cy-1d0 | 18 |
| 3-Cy-Cy-4 | 15 |
| 0d1-Cy-Cy-Ph-1 | 8 |
| 2-Ph—Ph1—Ph-3 | 10 |
| 2-Ph—Ph1—Ph-5 | 6 |
| 3-Ph—Ph1—Ph-5 | 5 |
| 2-Cy-Cy-Ph—F | 6 |
| 3-Cy-Cy-Ph—F | 5 |
| 5-Cy-Ph—Ph—F | 7 |
| 3-Cy-Ph—Ph3—F | 15 |
| 3-Cy-Cy-Ph1—Ph3—F | 5 |
| $T_{ni}/°C$ | 75.7 |
| $\Delta n$ | 0.125 |
| $\Delta \epsilon$ | 5.5 |
| $\gamma 1/mPa \cdot s$ | 103 |
| $\eta/mPa \cdot s$ | 18.4 |
| Comparative liquid crystal composition 8 | |
| 4-Cy-Cy-1d0 | 17 |
| 3-Cy-Cy-4 | 15 |
| 0d3-Cy-Cy-Ph-1 | 8 |
| 3-Cy-Ph—Ph-2 | 10 |
| 2-Ph—Ph1—Ph-5 | 7 |
| 3-Ph—Ph1—Ph-5 | 7 |
| 2-Cy-Cy-Ph—F | 6 |
| 3-Cy-Cy-Ph—F | 5 |
| 5-Cy-Ph—Ph—F | 7 |
| 3-Cy-Ph—Ph3—F | 14 |
| 3-Cy-Cy-Ph1—Ph3—F | 4 |
| $T_{ni}/°C$ | 85.3 |
| $\Delta n$ | 0.128 |
| $\Delta \epsilon$ | 4.8 |
| $\gamma 1/mPa \cdot s$ | 107 |
| $\eta/mPa \cdot s$ | 19.0 |

TABLE 43

| | Comparative Example 21 | Comparative Example 22 | Comparative Example 23 | Comparative Example 24 |
|---|---|---|---|---|
| Liquid crystal composition | Comparative liquid crystal composition 6 | Comparative liquid crystal composition 6 | Comparative liquid crystal composition 6 | Comparative liquid crystal composition 6 |
| Color filter | Color filter 1 | Color filter 2 | Color filter 3 | Color filter 4 |
| VHR | 97.9 | 98.1 | 98.4 | 98.3 |
| ID | 188 | 172 | 135 | 147 |
| Image sticking | D | D | D | D |

TABLE 44

| | Comparative Example 25 | Comparative Example 26 | Comparative Example 27 | Comparative Example 28 |
|---|---|---|---|---|
| Liquid crystal composition | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 |
| VHR | 97.8 | 98.0 | 98.2 | 98.3 |
| ID | 205 | 184 | 162 | 145 |
| Image sticking | D | D | D | D |

TABLE 45

| | Comparative Example 29 | Comparative Example 30 | Comparative Example 31 | Comparative Example 32 |
|---|---|---|---|---|
| Liquid crystal composition | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 |
| VHR | 97.9 | 98.1 | 98.3 | 98.5 |
| ID | 186 | 169 | 150 | 137 |
| Image sticking | D | D | D | C |

In the liquid crystal display devices of Comparative Examples 21 to 32, the VHRs were decreased and the IDs were increased compared with the liquid crystal display devices of the invention of this application. In the evaluation of image sticking, a residual image was observed, which was at an unacceptable level.

Comparative Examples 33 to 44

Comparative liquid crystal compositions 9 to 11 listed in Table 46 were sandwiched as in Example 1. Liquid crystal display devices of Comparative Examples 33 to 44 were produced using the color filters 1 to 4 listed in Table 9 and the VHR and ID were measured. The image sticking of the liquid crystal display devices was also evaluated. Tables 47 to 49 show the results.

TABLE 46

| Name of compound | Content (%) |
|---|---|
| Comparative liquid crystal composition 9 | |
| 2-Cy-Cy-Ph3—F | 10 |
| 0d1-Cy-Cy-Ph1—F | 8 |
| 2-Ph—Ph3—CFFO—Ph3—F | 4 |
| 3-Cy-Cy-Ph3—F | 10 |
| 2-Ph—Ph3—CFFO—Ph3—F | 6 |
| 3-Cy-Cy-Ph1—Ph3—F | 8 |
| 1-Cy-Cy-Ph3—F | 9 |
| 5-Cy-Cy-Ph3—F | 5 |
| 0d3-Ph-T-Ph—3d0 | 15 |
| 3-Cy-Ph-T-Ph-2 | 14 |
| 0d3-Ph—N—Ph-3d0 | 4 |
| 3-Ph—VO-Cy-VO—Ph-3 | 4 |
| 3-Cy-Cy-VO—Ph-Cy-3 | 3 |
| $T_{ni}/°C$ | 101.6 |
| $\Delta n$ | 0.153 |
| $\Delta\epsilon$ | 9.2 |
| $\gamma 1/mPa \cdot s$ | 101 |
| $\eta/mPa \cdot s$ | 23.7 |
| Comparative liquid crystal composition 10 | |
| 2-Cy-Cy-Ph3—F | 10 |
| 0d1-Cy-Cy-Ph1—F | 8 |
| 2-Ph—Ph3—CFFO—Ph3—F | 4 |
| 3-Cy-Cy-Ph3—F | 10 |
| 2-Ph—Ph3—CFFO—Ph3—F | 6 |
| 3-Cy-Cy-Ph1—Ph3—F | 8 |
| 1-Cy-Cy-Ph3—F | 9 |
| 5-Cy-Cy-Ph3—F | 5 |
| 0d3-Ph-T-Ph-3d0 | 10 |
| 3-Cy-Ph3-T-Ph9-1 | 4 |
| 4-Ph-T-Ph—O2 | 4 |
| 3-Cy-Ph-T-Ph-2 | 7 |
| 5-Cy-VO—Ph-1 | 5 |
| 3-Ph—VO-Cy-VO—Ph-3 | 7 |
| 3-Cy-Cy-VO—Ph-Cy-3 | 3 |
| $T_{ni}/°C$ | 96.4 |
| $\Delta n$ | 0.137 |
| $\Delta\epsilon$ | 8.8 |
| $\gamma 1/mPa \cdot s$ | 90 |
| $\eta/mPa \cdot s$ | 25.9 |
| Comparative liquid crystal composition 11 | |
| 2-Cy-Cy-Ph3—F | 10 |
| 0d1-Cy-Cy-Ph1—F | 8 |
| 3-Cy-Cy-Ph3—F | 10 |
| 2-Ph—Ph3—CFFO—Ph3—F | 6 |
| 3-Cy-Cy-Ph1—Ph3—F | 8 |
| 5-Cy-Cy-Ph3—F | 5 |
| 0d3-Ph-T-Ph-3d0 | 10 |
| 3-Cy-Ph3-T-Ph9-1 | 4 |
| 3-Cy-Cy-CFFO—Ph3—F | 4 |
| 4-Ph-T-Ph—O2 | 4 |
| 5-Cy-Cy-CFFO—Ph3—F | 9 |
| 5-Cy-VO—Ph-1 | 5 |
| 0d3-Ph—N—Ph-3d0 | 7 |
| 3-Ph—VO-Cy-VO—Ph-3 | 7 |
| 3-Cy-Cy-VO—Ph—Cy-3 | 3 |
| $T_{ni}/°C$ | 99.2 |
| $\Delta n$ | 0.136 |
| $\Delta\epsilon$ | 7.8 |
| $\gamma 1/mPa \cdot s$ | 105 |
| $\eta/mPa \cdot s$ | 26.6 |

TABLE 47

| | Comparative Example 33 | Comparative Example 34 | Comparative Example 35 | Comparative Example 36 |
|---|---|---|---|---|
| Liquid crystal composition | Comparative liquid crystal composition 9 | Comparative liquid crystal composition 9 | Comparative liquid crystal composition 9 | Comparative liquid crystal composition 9 |

TABLE 47-continued

| | Comparative Example 33 | Comparative Example 34 | Comparative Example 35 | Comparative Example 36 |
|---|---|---|---|---|
| Color filter | Color filter 1 | Color filter 2 | Color filter 3 | Color filter 4 |
| VHR | 97.8 | 98.1 | 98.3 | 98.3 |
| ID | 206 | 168 | 153 | 148 |
| Image sticking | D | D | D | D |

TABLE 48

| | Comparative Example 37 | Comparative Example 38 | Comparative Example 39 | Comparative Example 40 |
|---|---|---|---|---|
| Liquid crystal composition | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 |
| VHR | 97.8 | 98.0 | 98.3 | 98.3 |
| ID | 210 | 189 | 157 | 151 |
| Image sticking | D | D | D | D |

TABLE 49

| | Comparative Example 41 | Comparative Example 42 | Comparative Example 43 | Comparative Example 44 |
|---|---|---|---|---|
| Liquid crystal composition | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 |
| VHR | 98.1 | 98.1 | 98.3 | 98.4 |
| ID | 180 | 174 | 160 | 145 |
| Image sticking | D | D | D | D |

In the liquid crystal display devices of Comparative Examples 33 to 44, the VHRs were decreased and the IDs were increased compared with the liquid crystal display devices of the invention of this application. In the evaluation of image sticking, a residual image was observed, which was at an unacceptable level.

Comparative Examples 45 to 52

Liquid crystal display devices of Comparative Examples 45 to 52 were produced in the same manner, except that the comparative color filter 1 listed in Table 9 was used instead of the color filter 1 in Examples 5, 13, 17, 25, 37, 45, 61, and 65. The VHR and ID were measured. The image sticking of the liquid crystal display devices was also evaluated. Tables 50 and 51 show the results.

TABLE 50

| | Comparative Example 45 | Comparative Example 46 | Comparative Example 47 | Comparative Example 48 |
|---|---|---|---|---|
| Liquid crystal composition | Liquid crystal composition 2 | Liquid crystal composition 4 | Liquid crystal composition 5 | Liquid crystal composition 7 |

TABLE 50-continued

|  | Comparative Example 45 | Comparative Example 46 | Comparative Example 47 | Comparative Example 48 |
|---|---|---|---|---|
| Color filter | Comparative Color filter 1 | Comparative Color filter 1 | Comparative Color filter 1 | Comparative Color filter 1 |
| VHR | 98.4 | 98.3 | 97.8 | 97.9 |
| ID | 149 | 152 | 199 | 196 |
| Image sticking | D | D | D | D |

TABLE 51

|  | Comparative Example 49 | Comparative Example 50 | Comparative Example 51 | Comparative Example 52 |
|---|---|---|---|---|
| Liquid crystal composition | Liquid crystal composition 10 | Liquid crystal composition 12 | Liquid crystal composition 16 | Liquid crystal composition 17 |
| Color filter | Comparative Color filter 1 | Comparative Color filter 1 | Comparative Color filter 1 | Comparative Color filter 1 |
| VHR | 98.1 | 98.0 | 97.9 | 97.7 |
| ID | 170 | 186 | 190 | 215 |
| Image sticking | D | D | D | D |

In the liquid crystal display devices of Comparative Examples 45 to 52, the VHRs were decreased and the IDs were increased compared with the liquid crystal display devices of the invention of this application. In the evaluation of image sticking, a residual image was observed, which was at an unacceptable level.

The invention claimed is:

1. A liquid crystal display device comprising: a first substrate; a second substrate; a liquid crystal composition layer sandwiched between the first substrate and the second substrate;
a color filter including a black matrix and at least RGB three-color pixel portions; a pixel electrode; and a common electrode,
wherein the liquid crystal composition layer contains a liquid crystal composition that contains at least one compound represented by a general formula (I)

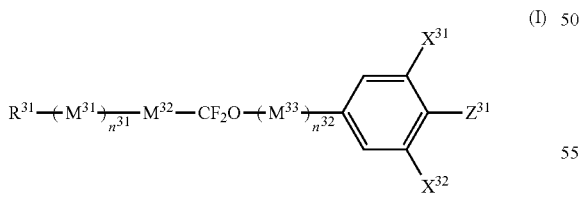
(I)

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group in which one or two —$CH_2$— in the trans-1,4-cyclohexylene group may be replaced by —O— such that oxygen atoms are not directly next to each other, and one or two hydrogen atoms in the phenylene group may be replaced by fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2 and $n^{31}+n^{32}$ is 0, 1, or 2; and in a case where there are a plurality of $M^{31}$ and $M^{33}$, the plurality of $M^{31}$ and $M^{33}$ may be the same or different), and that contains at least one compound selected from the group consisting of compounds represented by a general formula (II-b) to a general formula (II-f),

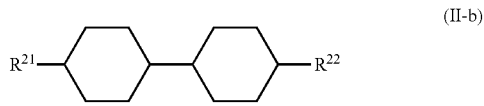
(II-b)

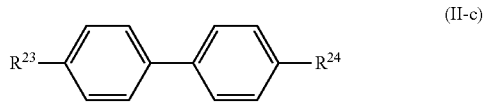
(II-c)

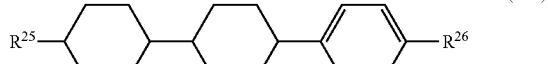
(II-d)

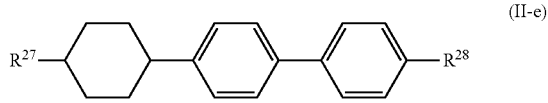
(II-e)

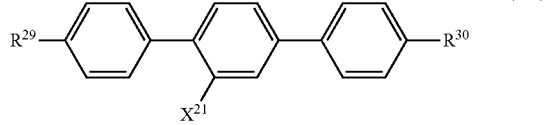
(II-f)

(in the formulae, $R^{21}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom), and
the RGB three-color pixel portions contain, as a coloring material in the R pixel portion, a diketopyrrolopyrrole-based red pigment having an average primary particle size of 5 to 50 nm measured by a small angle X-ray scattering method.

2. The liquid crystal display device according to claim 1, wherein the RGB three-color pixel portions contain, as a coloring material in the G pixel portion, at least one selected from the group consisting of a halogenated metal phthalocyanine pigment, a phthalocyanine-based green dye, and a mixture of a phthalocyanine-based blue dye and an azo-based yellow organic dye; and contain, as a coloring material in the B pixel portion, at least one selected from the group consisting of an ∈-type copper phthalocyanine pigment, a triarylmethane pigment, and a cationic blue organic dye.

3. The liquid crystal display device according to claim 1, wherein the R pixel portion further contains a pigment derivative.

4. The liquid crystal display device according to claim 1, wherein the R pixel portion further contains at least one of a quinacridone-based pigment derivative, a diketopyrrolopyrrole-based pigment derivative, an anthraquinone-based pigment derivative, and a thiazine-based pigment derivative.

5. The liquid crystal display device according to claim 1, wherein the RGB three-color pixel portions contain, as a coloring material in the G pixel portion, a halogenated metal phthalocyanine pigment having, as a central metal, a metal selected from the group consisting of Al, Si, Sc, Ti, V, Mg, Fe, Co, Ni, Zn, Cu, Ga, Ge, Y, Zr, Nb, In, Sn, and Pb; in a case where the central metal is trivalent, the central metal is bonded to any one of a halogen atom, a hydroxy group, and a sulfonic group, or the central metal is oxo- or thio-bridged; and, in a case where the central metal is a tetravalent metal, the central metal is bonded to one oxygen atom or two selected from halogen atoms, hydroxy groups, and sulfonic groups, the selected two being the same or different.

6. The liquid crystal display device according to claim 1, wherein the RGB three-color pixel portions contain, as a coloring material in the B pixel portion, a triarylmethane pigment represented by a general formula (1) below

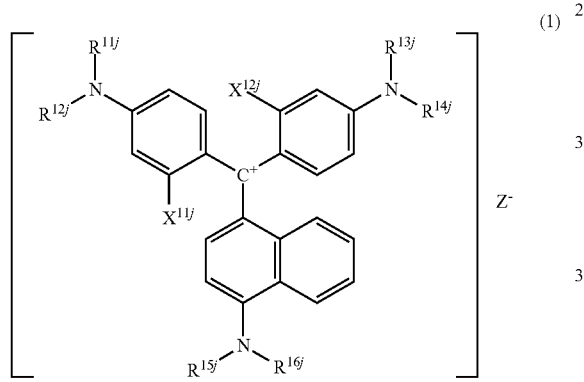

(1)

(in the formula, $R^{11j}$ to $R^{16j}$ each independently represent a hydrogen atom, an alkyl group having 1 to 8 carbons that may be substituted, or an aryl group that may be substituted; in a case where $R^{11j}$ to $R^{16j}$ represent an alkyl group that may be substituted, neighboring $R^{11j}$ and $R^{12j}$, $R^{13j}$ and $R^{14j}$, and $R^{15j}$ and $R^{16j}$ may be bonded so as to form ring structures; $X^{11j}$ and $X^{12j}$ each independently represent a hydrogen atom, a halogen atom, or an alkyl group having 1 to 8 carbons that may be substituted; $Z^-$ represents at least one anion selected from a heteropolyoxometalate anion represented by $(P_2Mo_yW_{18-y}O_{62})^{6-}/6$ where y represents an integer of 0, 1, 2, or 3, a heteropolyoxometalate anion represented by $(SiMoW_{11}O_{40})^{4-}/4$, and a lacunary Dawson phosphotungstic heteropolyoxometalate anion; and, in a case where a single molecule contains a plurality of the formula (1), the plurality of the formula (1) may represent the same structure or different structures).

7. The liquid crystal display device according to claim 1, wherein the RGB three-color pixel portions contain, as a coloring material in the G pixel portion, a mixture of C.I. Solvent Blue 67 and C.I. Solvent Yellow 162 and contain, as a coloring material in the B pixel portion, C.I. Solvent Blue 7.

8. The liquid crystal display device according to claim 1, wherein the RGB three-color pixel portions contain, as a coloring material in the G pixel portion, at least one selected from C.I. Pigment Green 7, 36, and 58, and contain, as a coloring material in the B pixel portion, C.I. Pigment Blue 15:6 and/or a triarylmethane pigment.

9. The liquid crystal display device according to claim 1, wherein the color filter includes the black matrix, the RGB three-color pixel portions, and a Y pixel portion; and the Y pixel portion contains, as a coloring material, at least one yellow organic dye or pigment selected from the group consisting of C.I. Pigment Yellow 150, 215, 185, 138, and 139, and C.I. Solvent Yellow 21, 82, 83:1, 33, and 162.

10. The liquid crystal display device according to claim 1, wherein compounds represented by the general formula (I) are compounds represented by a general formula (I-a) to a general formula (I-f)

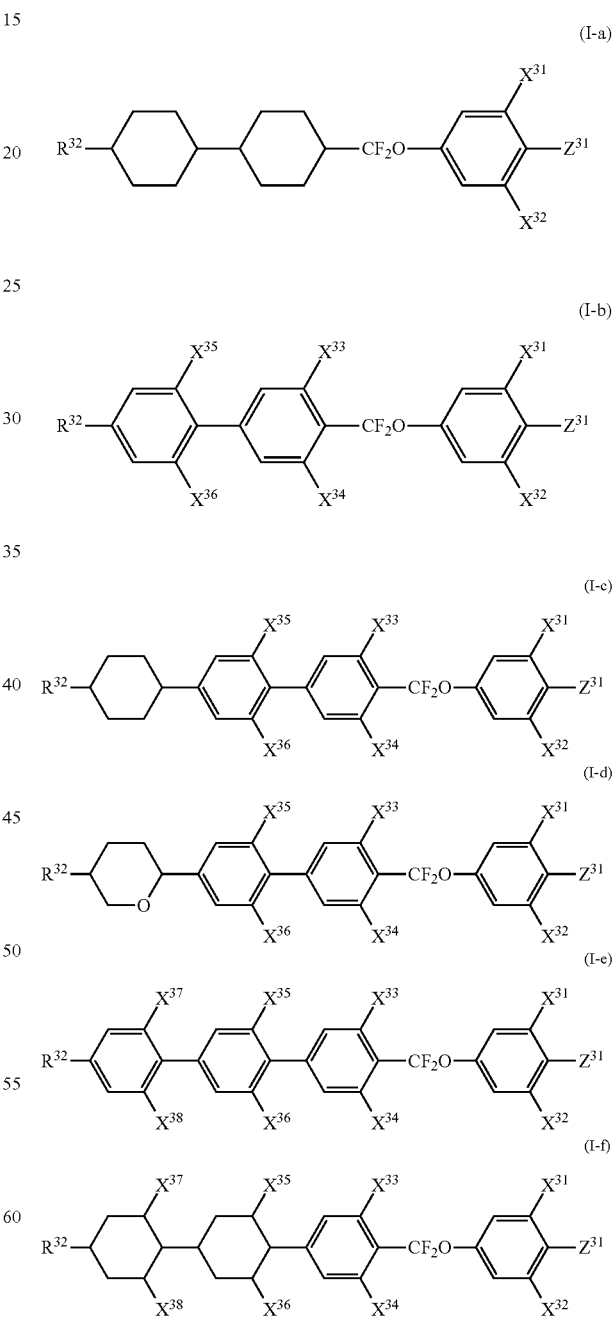

(in the formulae, $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{31}$ to $X^{38}$ each independently represent a hydrogen atom or a fluorine atom; and $Z^{31}$ represents a fluorine atom, a trifluoromethoxy group, or a trifluoromethyl group).

11. The liquid crystal display device according to claim 1, wherein the liquid crystal composition layer further contains at least one compound selected from the group consisting of compounds represented by a general formula (III-a) to a general formula (III-f)

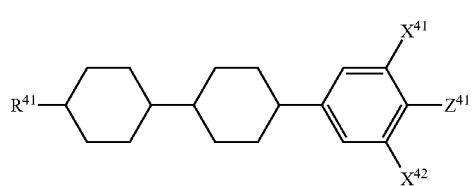
(III-a)

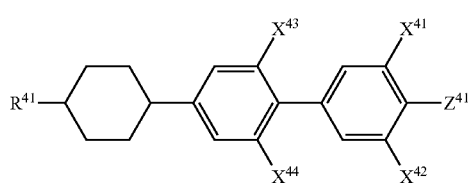
(III-b)

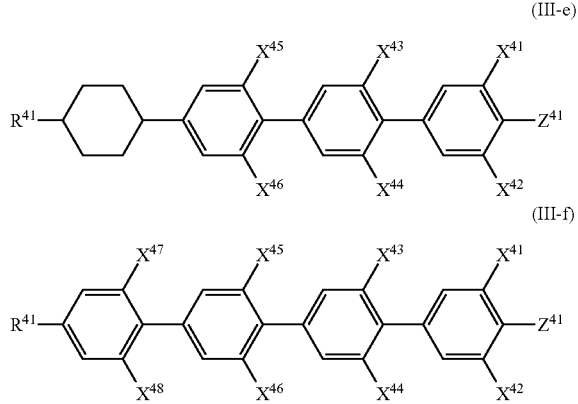
(III-e)

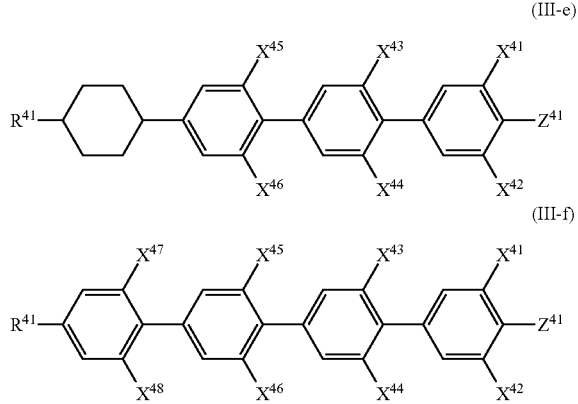
(III-f)

(in the formulae, $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group).

12. The liquid crystal display device according to claim 1, wherein the liquid crystal composition layer includes a polymer provided by polymerizing a liquid crystal composition containing at least one polymerizable compound.

13. The liquid crystal display device according to claim 1, wherein the liquid crystal composition layer contains a bifunctional monomer represented by a general formula (V)

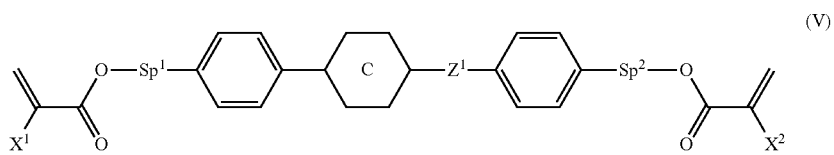
(V)

-continued

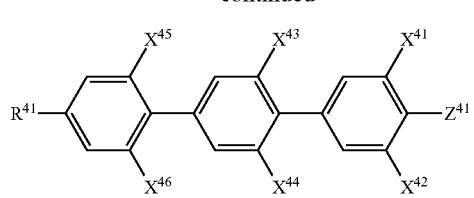
(III-c)

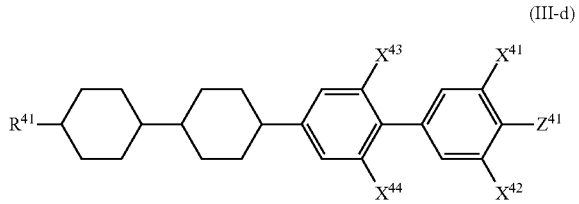
(III-d)

(in the formula, $X^1$ and $X^2$ each independently represent a hydrogen atom or a methyl group;

$Sp^1$ and $Sp^2$ each independently represent a single bond, an alkylene group having 1 to 8 carbon atoms, or —O—$(CH_2)_s$— (where s represents an integer of 2 to 7 and the oxygen atom is bonded to the aromatic ring); $Z^1$ represents —$OCH_2$—, —$CH_2O$—, —COO—, —OCO—, —$CF_2O$—, —$OCF_2$—, —$CH_2CH_2$—, —$CF_2CF_2$— CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—OCO—$CH_2$—, —$CH_2$—COO—, —$CH_2$—OCO—, —$CY^1$=$CY^2$— (where $Y^1$ and $Y^2$ each independently represent a fluorine atom or a hydrogen atom), —C≡C—, or a single bond; C represents a 1,4-phenylene group, a trans-1,4-cyclohexylene group, or a single bond; and any hydrogen atom in all 1,4-phenylene groups in the formula may be replaced by a fluorine atom).

* * * * *